(12) United States Patent
Bartkiewicz et al.

(10) Patent No.: US 11,003,343 B2
(45) Date of Patent: *May 11, 2021

(54) ELECTRONIC PERSONAL SIGNATURE GENERATION AND DISTRIBUTION FOR PERSONAL COMMUNICATION

(71) Applicant: Lett.rs LLC, Canton, CT (US)

(72) Inventors: Drew Charles Bartkiewicz, Canton, CT (US); Dane Alfred Bartkiewicz, Canton, CT (US)

(73) Assignee: LETT.RS LLC, Canton, CT (US)

( * ) Notice: Subject to any disclaimer, the term of this patent is extended or adjusted under 35 U.S.C. 154(b) by 366 days.

This patent is subject to a terminal disclaimer.

(21) Appl. No.: 15/359,598

(22) Filed: Nov. 22, 2016

(65) Prior Publication Data

US 2018/0143948 A1 May 24, 2018

Related U.S. Application Data

(63) Continuation of application No. 14/589,016, filed on Jan. 5, 2015, now Pat. No. 9,515,833.

(60) Provisional application No. 61/923,778, filed on Jan. 6, 2014.

(51) Int. Cl.
| | |
|---|---|
| *G06F 3/0484* | (2013.01) |
| *H04L 12/58* | (2006.01) |
| *H04L 29/06* | (2006.01) |
| *G06F 16/23* | (2019.01) |
| *G06F 40/171* | (2020.01) |
| *G06F 3/0488* | (2013.01) |

(52) U.S. Cl.
CPC ...... *G06F 3/04847* (2013.01); *G06F 16/2365* (2019.01); *G06F 40/171* (2020.01); *H04L 51/10* (2013.01); *H04L 51/32* (2013.01); *H04L 63/0861* (2013.01); *H04L 63/126* (2013.01); *G06F 3/04883* (2013.01)

(58) Field of Classification Search
CPC ..................................................... H04L 29/06
See application file for complete search history.

(56) References Cited

U.S. PATENT DOCUMENTS

| | | | |
|---|---|---|---|
| 9,059,858 B1* | 6/2015 | Giardina | H04L 9/3226 |
| 2003/0179913 A1* | 9/2003 | Murase | G06K 9/00154 |
| | | | 382/119 |
| 2009/0049534 A1* | 2/2009 | Chung | G06K 7/10346 |
| | | | 726/7 |

(Continued)

*Primary Examiner* — Hee K Song
(74) *Attorney, Agent, or Firm* — Ashok Tankha; Lipton Weinberger & Husick

(57) ABSTRACT

A computer implemented method and a personal communication system (PCS) for generating and delivering an electronically signed personalized communication are provided. The PCS receives a sender composed personal signature and media content from a sender device. The PCS configures one or more parameters of the received personal signature based on sender preferences, while maintaining integrity and originality of the received personal signature. The PCS positions the personal signature with the configured parameters in a predefined section of the received media content. The PCS generates the personalized communication including the received media content with the positioned personal signature and delivers the generated personalized communication to one or more recipients via one or more delivery modes.

22 Claims, 32 Drawing Sheets

(56) References Cited

U.S. PATENT DOCUMENTS

2016/0078277 A1* 3/2016 Sprigg ............... G06K 9/00174
                                                    382/119
2018/0143948 A1* 5/2018 Bartkiewicz ............ H04L 51/10

* cited by examiner

ELECTRONIC PERSONAL SIGNATURE GENERATION AND DISTRIBUTION FOR PERSONAL COMMUNICATION

CROSS REFERENCE TO RELATED APPLICATIONS

This application is a continuation application of non-provisional patent application Ser. No. 14/589,016, titled "Electronic. Personal Signature Generation And Distribution For Personal Communication", filed Jan. 5, 2015 in the United States Patent and Trademark Office, which claims priority to provisional patent application No. 61/923,778 titled "Electronic Personal Signature Generation And Distribution For Personal Communication", filed in the United States Patent and Trademark Office on Jan. 6, 2014, The specifications of the above referenced patent applications are incorporated herein by reference in their entirety.

BACKGROUND

With the advent of high speed communication technology that facilitates communication between people via social networking; platforms, text messages, electronic mails (emails), etc., the practice of communicating via digital messages has almost become the norm. However, these digital messages generally lack personalization, for example, by a personal mark made by a pen, a finger, etc., a personal signature of a sender of the digital message, etc. Conventional communication systems do not support meaningful and personally signed communication in the form of exchange of messages for business and personal uses. Personalized messages are typically aimed at conveying a person's emotions such as thoughts, sympathies, love, gratitude, etc. Adding an original, personal signature to such personalized messages and delivering the personalized messages together with the added personal signature enhances the level of intimacy associated with the communication. There is a need for personal communication via personal signature bundled personalized messages to provide recipients of these personalized messages an experience comparable to receiving a personally signed letter. Also, adding a personal signature to business correspondence is typically customary and therefore needed in exchanging business messages.

Personalizing, for example, modifying line style, line color, etc., of the signature based on a theme of the communication or based on preferences of a sender increases an overall, appeal of the communication. Conventional communication systems do not allow dynamic personalization of a personal signature while maintaining the integrity and originality of the personal signature. Also, such conventional communication systems do not authenticate digitally received personal signatures. A recipient of the communication would typically want to be assured that the source of a personalized message is authentic, that is, the communication has originated from a genuine source, that is, a genuine sender, a sender with whom the recipient is acquainted, or a sender with whom the recipient has previously communicated. Therefore, the recipient would like to receive a confirmation of an authentic personal signature, for example, a verified autograph of a sender along with the personalized message.

Hence, there is a long felt but unresolved need for a computer implemented method and system that generates and delivers an electronically signed and authenticated personalized communication such as a personalized message. Moreover, there is a need for a computer implemented method and system that dynamically configures a personal signature based on a theme of the personalized communication and/or sender preferences, while maintaining the integrity and originality of the personal signature. Furthermore, there is a need for a computer implemented method and system that authenticates a personal signature as an autograph of a sender of the personalized communication.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The computer implemented method and system disclosed herein addresses the above mentioned need for generating and delivering an electronically signed and authenticated personalized communication such as a personalized message. That is, the computer implemented method and system disclosed herein generates and delivers a well-crafted personalized communication such as a personal letter, a personal text, a personal message, an image, etc., embedded with an authenticated electronic personal signature. The computer implemented method and system disclosed herein dynamically configures a personal signature based on a theme of the personalized communication and/or sender preferences, while maintaining the integrity and originality of the personal signature. Furthermore, the computer implemented method and system disclosed herein authenticates a personal signature as an autograph of a sender of the personalized communication.

The computer implemented method disclosed herein employs a personal communication system comprising at least one processor configured to execute computer program instructions for generating and delivering an electronically signed and authenticated personalized communication. The personal communication system provides a graphical user interface (GUI) to enable a sender of the personalized communication to digitally create a personal signature or digitally compose a personal signature, provide media content for the personalized communication, and position the personal signature on the media content. The personal communication system receives media content and a personal signature composed by a sender from a sender device via the GUI. The media content comprises, for example, one or more of textual content, image content, audio content, video content, audiovisual content, multimedia content, animations, digital content, electronic mail (email) content, messaging content, voicemail content, document content, social media content such as "likes", "tweets", etc., and any combination thereof. After receiving the personal signature composed by the sender, the personal communication system authenticates the received personal signature.

The personal communication system configures one or more of multiple parameters of the received personal signature based on one or more sender preferences comprising, for example, a selected theme and one or more configuration inputs for the parameters, while maintaining the integrity and originality of the received personal signature. The parameters comprise, for example, ink color, font size, font background color, display style, line thickness, curve smoothness, etc.

The personal communication system positions the authenticated personal signature with the configured parameters in a predefined section, for example, at the bottom of the received media content. The personal communication system generates a personalized communication comprising the received media content with the positioned personal signature. The personal communication system delivers the generated personalized communication with the positioned personal signature to one or more recipients and/or recipient devices of the recipients via one or more of multiple delivery modes, for example, via digital delivery such as delivery of a text message and other media messages, via postal mail, etc.

In one or more embodiments, related systems include but are not limited to circuitry and/or programming for effecting the methods referenced herein; the circuitry and/or programming can be any combination of hardware, software, and/or firmware configured to effect the herein-referenced methods depending upon the design choices of a system designer. Also, various structural elements may be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing carries over to the description of that method step or component shown by that same numeral in any subsequent drawing herein.

DETAILED DESCRIPTION OF THE INVENTION

Figure 1:
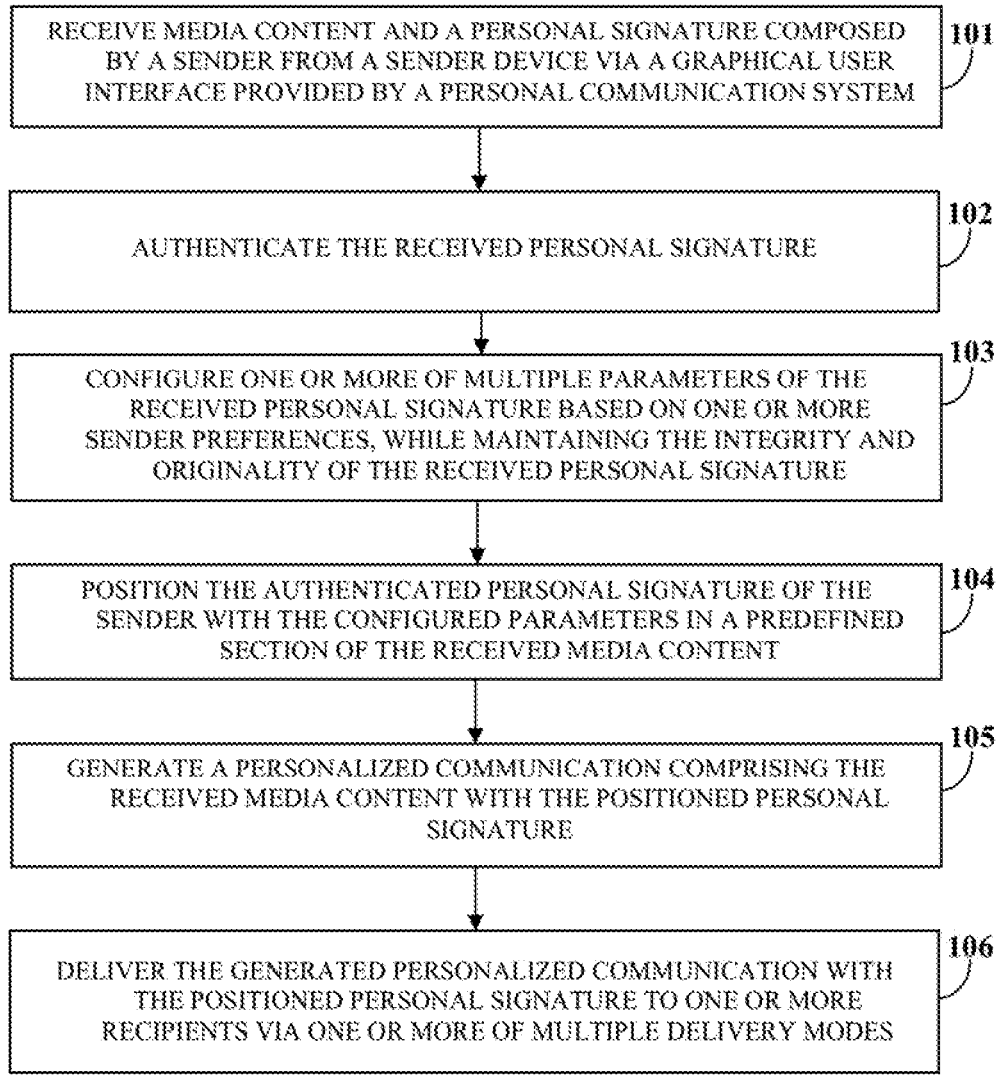
FIG. 1 illustrates a computer implemented method for generating and delivering an electronically signed and authenticated personalized communication.

FIG. 1 illustrates a computer implemented method for generating and delivering an electronically signed and authenticated personalized communication. As used herein, "electronically signed and authenticated personalized communication" refers to an authenticated personal communication, for example, a personal message, a personal letter, a personal text, a digital image, a picture, etc., and any other form of signed communication that is composed by a sender and that comprises an electronically derived and stylized depiction of the sender's name as proof of the sender's identity or intent. As used herein, the term "sender" refers to a user who originates or initiates creation and delivery of a personalized communication to a recipient. Also, as used herein, the term "recipient" refers to a user who receives, a personalized communication from a sender. The computer implemented method disclosed herein, employs a computer implemented personal communication system comprising at least one processor configured to execute computer program instructions for generating and delivering an electronically signed and authenticated personalized communication, for example, a personal message or any form that a signed message takes.

The personal communication system disclosed herein allows users, for example, senders and recipients to apply, optimize, authenticate, and deliver, computer generated personal signatures in a personalized communication by utilizing a rule based technology. As used herein, "personal signature" refers to an original signature, for example, a handwritten signature or an autograph composed by a sender. Also, as used herein, "rule base technology" refers to a computer technology that establishes a set of rules that the personal communication system automatically implements to perform the functions of the computer implemented method disclosed herein. In an embodiment, the personal communication system is incorporated in a sender device and in one or more recipient devices. As used herein, "sender device" refers to a communication device utilized by a sender of a personalized communication to access the personal communication system, provide media content and a personal signature, and, generate and deliver an electronically signed and authenticated personalized communication. Also, as used herein, "recipient device" refers to a communication device utilized by a recipient of a personalized communication. The personal communication system executes computer program codes, for example, using a Ruby on Rails® application framework for generating and delivering an electronically signed and authenticated personalized communication.

The personal communication system receives 101 media content and a personal signature and media content composed by a sender from a sender device, for example, the iPhone® of Apple Inc., via a graphical user interface (GUI) provided by the personal communication system. The sender provides media content for generating the personalized communication, for example, by writing, dictating, typing, drawing, uploading media content, etc., on the GUI of the personal communication system. The media content comprises, for example, one or more of textual content, image content, audio content, video content, audiovisual content, multimedia content, animations, digital content, electronic mail (email) content, messaging content, voicemail content, document content, social media content such as "likes", "tweets", etc., and any combination thereof.

A Ruby on Rails® implementation of a code snippet from a computer program code executed by the personal communication system for receiving the personal signature of the sender is disclosed below:

```
//1. Open signature space
(id)initWithNibName:(NSString *)nibNameOrNil bundle:(NSBundle *)nibBundleOrNil
{
        if (self = [super initWithNibName:nibNameOrNil bundle:nibBundleOrNil])
        {
                [self.view setBackgroundColor:[UIColor clearColor]];
        }
        return self;
}
(void)viewDidLoad
{
        [super viewDidLoad];
        [self.ltNavBar layoutThreeButtunMenuWithTitle:@"MAKE YOUR MARK"
        withToggle:NO];
        self.ltNavBar.mainNavButton.backgroundColor = [UIColor lightGrayColor];
        [self.ltNavBar.leftNavButton addTarget:self
        action:@selector(doneSignatureButtonTouched:)
        forControlEvents:UIControlEventTouchUpInside];
        [self.ltNavBar.rightNavButton addTarget:self
        action:@selector(doneSignatureButtonTouched:)
        forControlEvents:UIControlEventTouchUpInside];
        self.makeMarkButton.titleLabel.font = DINNextLTProFont(15.0f);
        self.clearSignatureButton.titleLabel.font = DINNextLTProFont(15.0f);
        self.authButton.titleLabel.font = DINNextLTProFont(15.0f);
}
(void)viewDidAppear:(BOOL)animated
{
        [self becomeFirstResponder];
        [self resetSignatureDraw];
        /* if([[NSUserDefaults standardUserDefaults] boolForKey:@"firstSignature"])
        {
        [[NSUserDefaults standardUserDefaults] setBool:NO
        forKey:@"firstSignature"];
        UIAlertView *alert = [[UIAlertView alloc] initWithTitle:@"Be Indelible*, Make
        Your Mark" message:@"Scribe your personal mark & affirmation here."
        delegate:self cancelButtonTitle:@"Okay, I got it!" otherButtonTitles:nil, nil];
        [alert show];
        }*/
}
(void)viewDidDisappear:(BOOL)animated
{
        [self becomefirstResponder];
}
```

In an embodiment, the GUI provided by the personal communication system is a touch enabled interface configured to receive a handwritten personal signature composed by the sender through one or more input modes comprising, for example, a manual input mode and a device input mode. As used herein, "manual input mode" refers to a mode of input of the personal signature via the GUI using a sender's anatomical parts comprising, for example, fingers, toes, etc. Also, as used herein, "device input mode" refers to a mode of input of the personal signature via the GUI using one or more signature input devices. The signature input devices comprise, for example, a finger brush, a stylus pen, a digital pert, an active pen, a light pen, etc. The personal communication system has a computer enhanced and generated, signed personal messaging capability that derives the sender's personal signature, for example, from a stylus pen, a finger brush, a digital pen, etc., on the GUI of the personal communication system. The personal communication system enables a personalized communication originator, that is, the sender of the personalized communication to create a personal signature for a private letter via the sender device. For example, the sender creates a personal signature, for example, an original mark of the signee, by using free strokes of a signature input device such as a stylus pen or by using manual free strokes created using one or more fingers of the sender's hand, within a predefined section that the personal communication system designates on the GUI to receive the personal signature. In an embodiment, the sender can create and provide a personal signature as a drawing comprising, for example, a sketch, a design, an illustration, a cartoon, a doodle, initials, etc., and any combination thereof, on the GUI of the personal communication system. Thus, the personal communication system, via the GUI, facilitates creation of the handwritten personal signature in a digital form to recreate a personal signature typically used as a correspondence mark of a conventional physical letter communication.

The personal communication system authenticates 102 the received personal signature as an autograph of the sender of the personalized communication. To authenticate the received personal signature of the sender, the personal communication system receives biometric input data from the sender device while receiving the personal signature via the GUI of the personal communication system and compares the received biometric input data with biometric identification data associated with the sender device. As used herein, "biometric input data" refers to data representing human characteristics, for example, fingerprints of one or more fingers of a sender that the sender uses for providing the personal signature to the personal communication system via the GUI. Also, as used herein, "biometric identification data" refers to data used to identify a sender, for example, fingerprint data of a sender that the sender stores on his/her sender device as an access code for unlocking the sender device. In an embodiment, the personal communication system authenticates the received personal signature of a specific sender using touch identification (ID) technology, for example, the Touch ID fingerprint recognition technology of Apple Inc., for authenticating the received personal signature and converting the received personal signature into an original digital autograph of that specific sender who is an owner of the sender device or has registered his/her biometric identification data in the sender device.

The personal communication system authenticates the received personal signature as an original autograph of the sender by matching the biometric identification data comprising, for example, finger touch identification (ID) data, with the received biometric input data. In an embodiment, the personal communication system provides an authentication window for authenticating the received personal signature within a short time period of receiving the personal signature, for example, within about 5 seconds to about 10 seconds. The personal communication system authenticates the received personal signature for generating and associating an autograph status to the authenticated personal signature. For facilitating authentication of the personal signature by the personal communication system, the personal communication system is operable with and/or configurable on multiple types of sender devices. For example, the personal communication system adapts to any sender device, for example, a mobile device, configured with a finger touch ID hardware interface for authenticating the received personal signature of the sender.

Consider an example where a sender, using a sender device, accesses the personal communication system for generating and delivering a personalized communication electronically signed with the sender's personal signature as an autograph. The sender uploads an image that he/she wishes to send to one or more recipients, to the personal communication system via the GUI. The sender physically touches and moves his/her finger, for example, an index finger on the GUI to create a personal signature to be positioned on the uploaded image. The personal communication system receives the created personal signature via the GUI. In an embodiment, the personal communication system provides an option to the sender to authenticate the received personal signature as an autograph. When the sender selects the option to authenticate his/her personal signature, the personal communication system prompts the sender to provide the biometric input data, that is, fingerprint data of the index finger used by the sender for creating the personal signature. For example, the sender provides the biometric input data by physically touching his/her index finger and/or holding; the index finger onto a home button configured with a touch sensor, on the sender device. The personal communication system retrieves the biometric identification data, for example, the fingerprint data stored as touch identification (ID) data for unlocking the sender device, from a memory unit of the sender device. The touch ID data is stored in the memory unit of the sender device as an access code. The personal communication system compares the biometric input data provided by the sender with the retrieved biometric identification data. If the comparison results in a positive match, then the personal communication system authenticates the received personal signature as the sender's autograph. The personal communication system confirms the biometric touch ID match of the sender, that is, the personal signature composer, to provide an autograph status to the sender's personal signature.

A Ruby on Rails® implementation of a code snippet from a computer program code executed by the personal communication system for authenticating the received personal signature of the sender is disclosed below:

```
(IBAction)authenticateButtonTapped:(id)sender
{
    if (_drawView.hasDrawing)
    {
        LAContext *context = [[LAContext alloc] init];
        NSError *error = nil;
        if ([context
        canEvaluatePolicy:LAPolicyDeviceOwnerAuthenticationWithBiometrics
        error:&error])
        {
            [SVProgressHUD showWithStatus:@"Authenticating"];
            [context
            evaluatePolicy:LAPolicyDeviceOwnerAuthenticationWithBiometrics
            localizedReason:@"Are you the letter owner?"
            reply:^(BOOL success, NSError *error){
            if (error)
            {
            UIAlertView *alert = [[UIAlertView alloc] initWithTitle:@"Error"
            message:@"There was a problem verifying your identity."
            delegate:nil
            cancelButtonTitle:@"Ok"
            otherButtonTitles:nil];
            [alert show];
            [SVProgressHUD dismiss];
            return;
            }
            if (success)
            {
            UIAlertView *alert [[UIAlertView alloc] initWithTitle:@"Success"
            message:@"You have authenticated your signature for this letter"
            delegate:nil
            cancelButtonTitle:@"Ok"
            otherButtonTitles:nil];
            [alert show];
            [self saveAndDismiss];
            [SVProgressHUD dismiss];
            }
```

```
        else
        {
            UIAlertView *alert = [[UIAlertView alloc] initWithTittle:@"Error"
            message:@"You are not the device owner,"
            delegate:nil
            cancelButtonTitle:@"Ok"
            otherButtonTitles:nil];
            [alert show];
            [SVProgressHUD dismiss];
        }
        }];
    }
    else
    {
        UIAlertView *alert = [[UIAlertView alloc] initWithTitle:@"Error"
        message:@"Your device cannot authenticate using TouchID."
        delegate:nil
        cancelButtonTitle:@"Ok"
        otherButtonTitles:nil];
        [alert show];
        [SVProgressHUD dismiss];
    }
}
else
{
    UIAlertView *alert = [[UIAlertView alloc] initWithTitle:@"Signature Error"
    message:@"You need to add signature in order to validate"
    delegate:nil
    cancelButtonTitle:@"Ok"
    otherButtonTitles:nil];
    [alert show];
}
}
```

The personal communication system configures 103 one or more of multiple parameters of the received personal signature based on one or more sender preferences, while maintaining the integrity and originality of the received personal signature. The parameters comprise, for example, ink color, font size, font background color, display style, line thickness, curve smoothness, etc. The sender preferences comprise, for example, selected theme and one or more configuration inputs for the parameters. As used herein, "configuration inputs" refer to inputs provided by the sender for changing the parameters of the personal signature. The configuration inputs comprise, for example, a default theme, a default font size, a default ink color, etc. In an embodiment, the sender sets the configuration inputs after registration with the personal communication system or at the time of configuring the personal communication system on the sender device. In an embodiment, the personal communication system configures the sender preferences based on the settings provided by the sender during registration with the personal communication system. The personal communication system uses specific rides for allowing the sender to modify the parameters of the personal signature. For example, the sender can use the personal communication system to modify the font color of a personalized communication based on sender preferences set by the sender using themes provided by the personal communication system. In this example, the personal signature of the sender automatically inherits the ink color from the theme in use. In an embodiment, the personal communication system automatically configures an ink color of the personal signature based on a default ink color preference received as a configuration input at the time of registration of the sender with the personal communication system. In an embodiment, the personal communication system configures the parameters of the personal signature, for example, based on a theme or a default ink color on receiving the personal signature from the sender, that is, on origination, or creation, or composition of the personal signature by the sender.

The personal communication system maintains a uniform thickness throughout a stroke of the sender's personal signature. In an embodiment, the personal communication system performs automatic curve smoothing to avoid a jagged appearance of the personal signature according to personalization choices selected by the sender or the configuration inputs provided by the user. The personal communication system maintains the personal signature while other parameters, for example, the background, the font size, the font color, etc., of the personalized communication change based on the sender preferences. The maintenance of the integrity and originality of the received personal signature comprises maintaining a font style of the received personal signature irrespective of a change in the sender preferences. For example, the personal communication system maintains a font style of the personal signature irrespective of a change in the theme selected by the sender.

A Ruby on Rails® implementation of a code snippet from a computer program code executed by the personal communication system for configuring one or more parameters of the received personal signature of the sender is disclosed below:

```
(void)setDefaultbkImage:(UIImage *)defaultbkImage
{
    defaultbkImage = defaultbkImage;
    [self.view setBackgroundColor:[UIColor colorWithPatternImage:_defaultbkImage]];
}
(void)setSignatureImage:(UIImage *)signatureImage
```

```
{
    if (signatureImage != signatureImage)
    {
        startedFromExisting = YES;
        signatureImage = signatureImage;
        if (_signatureImage)
        {
        [_drawView setDrawImage:_signatureImage];
        }
    }
}
```

In an embodiment, the personal communication system facilitates performance of one or more actions on the received personal signature based on one or more action inputs received from the sender device. As used herein, "action inputs" refer to inputs defining one or more actions to be performed on the personal signature. The action inputs comprise, for example, review, approve, authenticate, clear, save and return, cancel, etc. The actions comprise, for example, reviewing the personal signature, modifying the personal signature, approving the personal signature, deleting the personal signature, initiating authentication of the personal signature, etc. In this embodiment, the personal communication system allows the sender to review the personal signature, accept the personal signature, or redo the personal signature to create and apply a new signature to a personalized communication.

A Ruby on Rails® implementation of a code snippet from a computer program code executed by the personal communication system for facilitating the performance of one or more actions on the received personal signature of the sender is disclosed below:

```
(IBAction)doneSignatureButtonTouched:(id)sender
{
/*
if (!_drawView.hasChanged && !_hasClear) {
[self dismissWithoutSave];
}else if (!_startedFromExisting || (_hasClear && !_drawView.hasChanged)) {
[self saveAndDismiss];
} else {
doneSheetIndices.save = -1;
doneSheetIndices.discardChanges = -1;
UIActionSheet *actionSheet = [UIActionSheet new];
actionSheet.delegate = self;
doneSheetIndices.save = [actionSheet addButtonWithTitle:LS(@"Save & Return")];
doneSheetIndices.discardChanges = [actionSheet addButtonWtihTitle:LS(@"Discard Changes")];
actionSheet.cancelButtonIndex = [actionSheet addButtonWithTitle:LS(@"Cancel")];
actionSheet.tag = DoneActionSheet;
[actonSheet shownInView:self.view];
}
*/
[self saveAndDismiss];
}
(IBAction)clearSignatureButtonTouched:(id)sender
{
/*
UIAlertView *alert = [[UIAlertView alloc] initWithTitle:LS(@"Are you sure to clear
your signature?")
message:nil
delegate:self
cancelButtonTitle:LS(@"Cancel")
otherButtonTitle:LS(@"Clear"), nil];
alert.tag = ClearAlertTag;
[alert show];
*/
if (_drawView.hasDrawing) {
        signatureImage = nil;
        [self resetSignatureDraw]; }
}
(void)actionSheet:(UIActionSheet *)actionSheet
didDismissWithButtonIndex:(NsInteger)buttonIndex
{
        if (buttonIndex == actionSheet.cancelButtonIndex) {
        return; } else {
        if (actionSheet.tag == DoneActionSheet){
                if (buttonIndex == _doneSheetIndices.save){
                        [self saveAndDismiss];
                } else if (buttonIndex == _doneSheetIndices.discardChanges)
                {
                        UIAlertView *alert = [[UIAlertView alloc]
                        initWithTitle:LS(@"Are you sure to discard the changes to
```

```
                your signature?")
                message:nil
                delegate:self
                cancelButtonTitle:LS(@"Cancel")
                otherButtonTitles:LS(@"Discard"), nil];
                alert.tag = DiscardChangesAlertTag;
                [alert show];
            }
        }
    }
}
#pragma marks -- UIAlertViewDelegate -
(void)alertView:(UIAlertView *)alertView
didDismissWithButtonIndex:(NSInteger)buttonIndex
{
    if(buttonIndex == alertView.cancelButtonIndex){
        return;
    }else{
        if (alertView.tag == ClearAlertTag) {
            hasClear = YES;
            if (_drawView.hasDrawing) {
                signatureImage = nil;
                [self restSignatureDraw];
            }
        } else if (alertView.tag == DiscardChangesAlertTag) {
            [self dismissWithoutSave];
        } else {
            [self resetSignatureDraw];
        }
    }
}
```

The personal communication system positions 104 the authenticated personal signature of the sender with the configured parameters in a predefined section, for example, the bottom left corner, the bottom right corner, the bottom center, etc., of the received media content. The personal communication system attaches the sender's personal signature in a particular and engineered portion of the personalized communication similar to the location of a signature in a conventional paper type personal correspondence.

A Ruby on Rails® implementation of a code snippet from a computer program code executed by the personal communication system for positioning the authenticated personal signature of the sender with the configured parameters in a specific predefined section of the received media content, that is, the personal message is disclosed below:

```
(void)saveAndDismiss
{
    [self.delegate drawSignatureViewController:self
        didChangeSignatureImage:[_drawView getDrawSignature]];
    [self dismissThisViewController];
}
(void)dismissWithoutSave
{
    [self.delegate dismissDrawSignatureViewControllerWithoutSave:self];
    [self dismissThisViewController];
}
(void)dismissThisViewController
{
    if (UIInterfaceOrientationIsPortrait([UIApplication
        sharedApplication].statusBarOrientation)) {
            [self.presentingViewController.presentingViewController
            dismissViewControllerAnimated:YES completion:nil];
        } else {
            [self dismissViewControllerAnimated:YES completion:nil];
        }
}
(void)resetSignatureDraw
{
    [_drawView removeFromSuperview];
    CGRect screenRect = [[UIScreen mainScreen] bounds];
    CGFloat screenWidth = screenRect.size.width;
    drawView = [[SmoothLineView alloc] initWithFrame:CGRectMake(0, _
    toolBar.frame.size.height,screenWidth, _touchView.frame.size.height)];
    //[self
    setDrawViewGeometryToLandscape:UIInterfaceOrientationIsLandscape([UIApp
    lication sharedApplication].statusBarOrientation)];
    [_touchView addSubview:_drawView];
    if(_signatureImage)
    {
```

```
        [_drawView setDrawImage:_signatureImage];
    }
        [_touchView sendSubviewToBack:_drawView];
}
```

In an embodiment, the personal communication system allows the sender to add or embed a personal signature to the media content, for example, a picture, a digital image, etc., received from the sender device, for example, the IPhone® of Apple Inc. The personal communication system positions the personal signature on the received media content, for example, by embedding the personal signature, overlaying the personal signature, or amending the personal signature to the received media content After positioning the personal signature in the received media content, the personal communication system enables the sender to preview the received media content along with the positioned personal signature via the sender device or via a browser. The personal communication system allows for integration of a unique personal signature of the sender per personalized communication.

In an embodiment, the personal communication system assigns an authentication indicator proximal to the positioned personal signature of the sender or the media content received from the sender device for indicating an authenticated status of the received personal signature. The authentication indicator comprises, for example, an icon, a symbol, a stamp, a logo, an emblem, a code, an image, a digital watermark, a multimedia object such as an animation, etc., in one or more of multiple sizes and shapes. Examples of the authentication indicator comprise a star, a polygon, a checkmark, etc. In an embodiment, the personal communication system positions the authentication indicator in a predefined section, for example, a top right section, a top left section, a bottom left section, a bottom right section, a top center section, a bottom center section, etc., proximal to the positioned personal signature or the media content received from the sender device. In another embodiment, the personal communication system dynamically selects the authentication indicator based on sender preferences comprising, for example, a selected theme and one or more configuration inputs. For example, for a personalized communication with a music theme, the personal communication system selects a musical note symbol such, as a musical single bar note symbol or a musical whole note symbol as the authentication indicator and positions the authentication indicator at a predefined section proximal to the positioned personal signature on the received media content. The authenticated status provided by the authentication indicator to the positioned personal signature represents an autograph status of the personal signature. The personal communication system generates and positions the authentication indicator, for example, an icon, a digital watermark, etc., proximal to the positioned personal signature or the received media content, to mark the positioned personal signature with the autograph status. For example, the authentication indicator displayed next to or around the positioned personal signature of the sender symbolizes the authenticated and original autograph status of the personal signature composed by the sender.

The personal communication system generates 105 a personalized communication comprising the received media content with the positioned personal signature, for example, using a theme and writing, options selected by the sender. The personal communication system generates, for example, a text based personalized communication such as a personal letter, a personal text, an audio based personalized communication such as a recorded audio letter, or a video based personalized communication such as a recorded video letter based on the type of media content received from the sender device. In an embodiment, the personal communication system publishes the generated personalized communication with the positioned personal signature for public viewing on receiving a confirmation from the sender of the generated personalized communication to make the personalized communication public. In this embodiment, the personal communication system renders multiple personalized communications with multiple personal signatures in an explore section that makes publicly available the published personalized communications.

Figure 8:
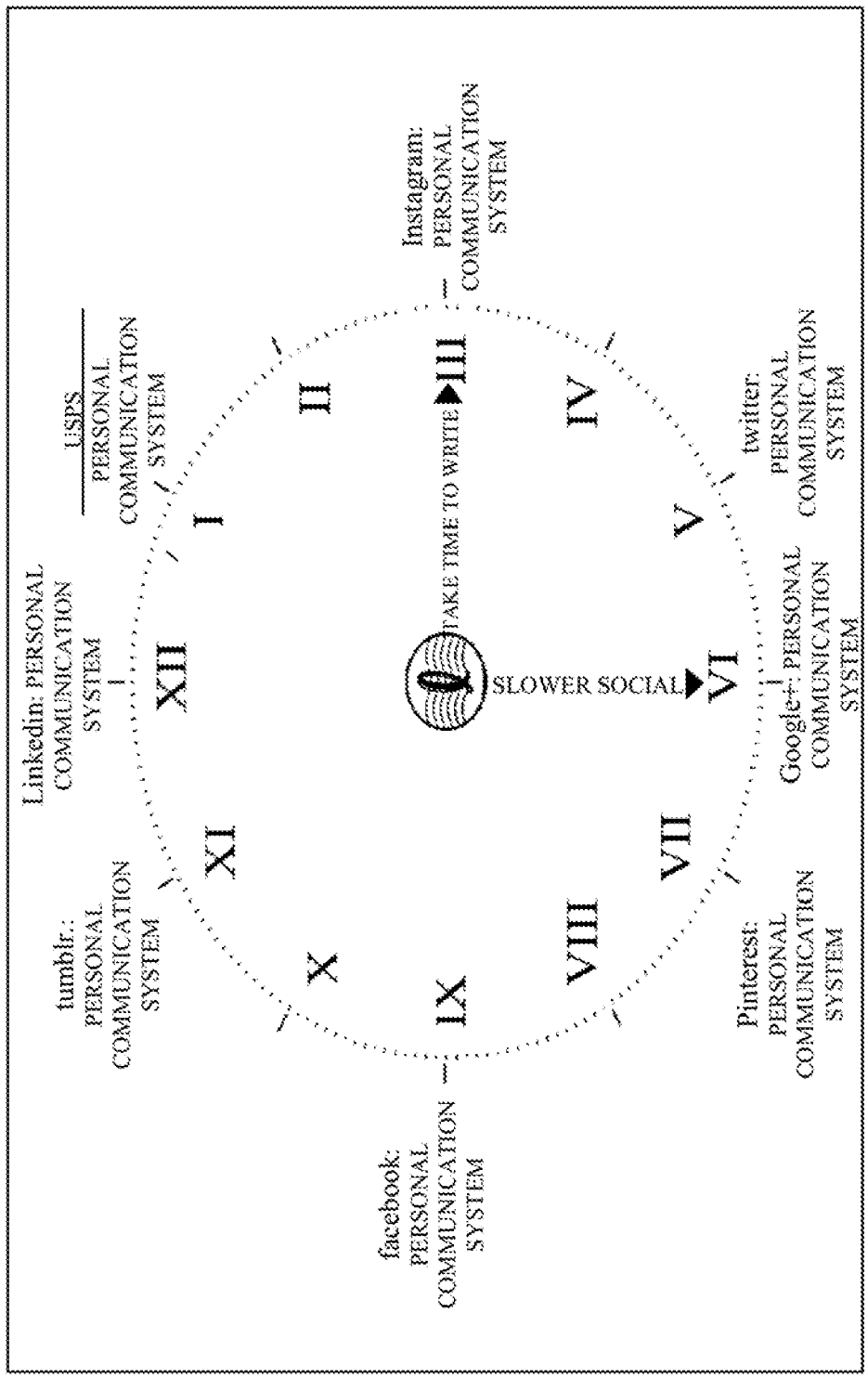
FIG. 8 exemplarily illustrates multiple delivery modes employed by the personal communication system for delivering the electronically signed and authenticated personalized communication to one or more recipients and/or recipient devices of the recipients.

The personal communication system delivers 106 the generated personalized communication with the sender's positioned personal signature to one or more recipients and/or recipient devices of the recipients via one or more of multiple delivery modes, for example, digital mail, postal mail, etc., as exemplarily illustrated in FIG. 8. The delivery modes comprise, for example, communication, channels in social networks, electronic mail (email) systems, short message service systems, multimedia messaging service systems, online blogs, postal delivery systems, etc. In addition to generating the personal signature in an accurate position on the received media content, the personal communication system delivers a bundled message comprising the personalized communication and the personal signature to the recipients and/or the recipient devices. The personal communication system distributes the personalized communication across digital delivery modes, for example, using application programming interfaces (APIs) within the personal communication system, to render the personal signature in a particular position on the personalized communication.

In an embodiment, the personal communication system delivers the generated personalized communication with the positioned personal signature of the sender to one or more recipients and/or recipient devices when an optimal time condition defining a minimum time required for composing the personalized communication is met. The optimal time condition defines a minimum time required for composing the personalized communication by the sender based on a preliminary time condition configured by the personal communication system or time parameters defined by a sender and/or a recipient. In this embodiment, the personal communication system configures a preliminary time condition and displays the configured preliminary time condition on the sender device via the GUI of the personal communication system. The configured preliminary time condition defines a minimum time required for composing the personalized communication by the sender. In an embodiment, the personal communication system allows both senders and recipients to influence the minimum time for writing and receiving a personalized communication. The personal communication system determines an optimal time condition selected from the configured preliminary time condition, a sender configured time condition, and a recipient configured time condition as disclosed in the co-pending non-provisional patent application Ser. No. 14/559,897 titled "Time Based Personal Communication", filed in the United States Patent and Trademark Office on Dec. 3, 2014, which is incorporated herein by reference in its entirety. The personal communication system detects an attempt by a sender to generate and send the personalized communication based on the received media content. The personal communication system times the composition of the personalized. communication on detection of the attempt to generate and send the personalized communication based on the received media content. The personal communication system generates a timing verification report based on the timing for verifying whether the determined optimal time condition is met. The timing report comprises a total time devoted by the sender in composing the personalized communication. The personal communication system performs an action based on the verification indicated in the generated timing verification report. For example, the personal communication system renders a notification to the sender device for instructing the sender to continue composing the personalized communication until the determined optimal time condition is met, or generates the personalized communication based on the media content received from the sender and delivers the generated personalized communication to one or more recipients and/or recipient devices when the determined optimal time condition is met.

Consider an example where the personal communication system configures a preliminary time condition of 1 minute for composing a personalized communication. If the sender has not devoted at least 1 minute to compose the personalized communication and proceeds to submit the composed personalized communication to the personal communication system, the personal communication system displays a notification instructing the sender to continue composing the personalized communication until minute has lapsed. If the sender has devoted 1 minute or more to compose the personalized communication and then proceeds to submit the composed personalized communication to the personal communication system, the personal communication system generates the personalized communication with the positioned personal signature and delivers the personalized communication with the positioned personal signature to one or more recipients and or recipient devices.

Consider another example where a sender wishes to compose a personalized communication, for example, a Christmas greetings letter and deliver the composed letter to a recipient device as a private letter. The sender invokes the personal communication system via a sender device, for example, a smartphone. The sender registers or logs in to the personal communication system via the sender device. The sender accesses the GUI provided by the personal communication system, selects a private letter delivery option, and selects a theme, for example, a snowfall theme, suitable for the Christmas greetings letter. The sender types content for the Christmas greetings letter on the GUI and uploads an image, for example, a Christmas tree image to be attached to the typed content for the Christmas greetings letter, to the personal communication system. The sender provides a personal signature and biometric input data via the GUI using, for example, a finger. The personal communication system authenticates the sender's personal signature by comparing the received biometric input data, that is, the fingerprint of the sender's finger with a touch identification (ID) access code associated with the sender device for unlocking the sender device. The personal communication system dynamically configures the parameters, for example, font color, font size, etc., of the personal signature based on the snowfall theme selected, while maintaining the integrity and originality of the personal signature. The personal communication system positions the authenticated personal signature with the configured parameters in a predefined section, for example, bottom left, of the typed content for the Christmas greetings letter. The personal communication system assigns an authentication indicator, for example, a blue colored star mark, a red colored Christmas bell, etc., proximal to the positioned personal signature to indicate an authenticated status of the personal signature. The personal communication system generates and displays the Christmas Greetings letter with the positioned personal signature on the GUI. If the time taken by the sender for composing the Christmas greetings letter meets the optimal time condition of the personal communication system, the personal communication system delivers the generated Christmas greetings letter along with the positioned personal signature to the intended recipient via a delivery mode, for example, an electronic mail system, a short message service system, etc., for a private digital delivery of the Christmas greetings letter.

A Ruby on Rails® implementation of an example code snippet from a computer program code executed by the personal communication system for incorporating a personal signature of a sender in a personalized communication composed by the sender is disclosed below:

```
# embeds_one :letter_signature, autobuild: true, cascade_callbacks: true
embeds_one :letter_signature, autobuild: true
embeds_many :translations
accepts_nested_attributes_for :letter_address, :package, :custom_theme
aceepts_nested_attributes_for :letter_tags, :from_location, :to_location, :letter_signature,
allow_destroy: true
# NOTICE: link_existing will link existing LetterAttach model to this letter immediately via
# attribute 'cached_id'.
aecepts_nested_attributes_for :letter_attachs, allow_destroy: true, reject_if:
:link_existing
alias_method :attachments_attributes=, :letter_attachs_attributes=
attr_accessor :want_future_mailing, :send_to_uid, :signature_cache, :remove_signature
after_save :process_signature
def send_to_uid=(uid)
return if uid.blank?
self.send_to = uid
self.send_to_type = 'uid'
end
def send_to_uid
send_to_type == 'uid' ? send_to : nil
end
```

```
def send_to_user
send_to_type = 'uid'? User.where(id: send_to).first : nil
end
def process_signature
if letter_signature
if @signature_cache
letter_signature.image_cache = @signature_cache
letter_signature.save
letter_signature.image.recreate_versions!(:full, :desk, :thumb, :ios_list, :ios_detail)
elsif ['1', 1, 'true', true, 'yes'].include?(@remove_signature)
letter_signature.destroy
end
elsif @signature_cache
build_letter_signature
letter_signature.image_cache = @signature_cache
letter_signature.save
letter_signature.image.recreate_versions!(:full, :desk, :thumb, :ios_list, :ios_detail)
end
rescue => error
logger.w "error in process_signature: #{error.inspect}"
end
```

A Ruby on Rails® implementation of a code snippet from a computer program code executed by the personal communication system for performing one or more auxiliary actions is disclosed below. The auxiliary actions comprise, for example, configuring background color of an edit window 504, orienting the edit window 504 in a landscape orientation or a portrait orientation as exemplarily illustrated in FIGS. 5F-5G, etc.

```
(BOOL)shouldAutorotate
{
        return YES;
}
(UIInterfaceOrientation)preferredInterfaceOrientationForPresentation
{
        UIInterfaceOrientation orientation = [UIApplication
        sharedAppllication].statusBarOrientation;
        if(orientation == UIInterfaceOrientationLandscapeLeft)
        {
                return UIInterfaceOrientationLandscapeLeft;
        }else if(orientation == UIInterfaceOrientationLandscapeRight)
        {
                return UIInterfaceOrientationLandscapeRight;
        }else{
                return UIInterfaceOrientationPortrait;
        }
}
(void)willAnimateRotationToInterfaceOrientation:(UIInterfaceOrientation)toInterfaceOri
entation duration:(NSTimeInterval)duration
{
        [super willAnimateRotationToInterfaceOrientation:toInterfaceOrientation
        duration:duration];
        if (UIInterfaceOrientationIsLandscape(toInterfaceOrientation))
        {
                [UIView animateWithDuration:.25 animations:^{
                {self.view changeFrame:^(CGRect *f){
                f->size.height = self.view.frame.size.width;
                f->size.width = self.view.frame.size.height;
                f->origin.x = 0;
                f->origin.y = 0;
                }];
                [self.transluscentView changeFrame:^(CGRect *f){
                f->size.width = _signatureDrawView.frame.size.height;
                f->size.height = _signatureDrawView.frame.size.width;
                f->origin.x = 0;
                f->origin.y = 0;
                }];
                [self.touchView changeFrame:^(CGRect *f) {
                f->size.height = _signatureDrawView.frame.size.width-20;
                f->size.width = 480;
                f->origin.y = 20;
                if ([UIScreen mainScreen].bounds.size.height == 568) {
                f->origin.x = 44;
                }else{
                f->origin.x = 0;
                }
                }];
                suggestTextField.hidden = YES;
```

```
                [self.view setBackgroundColor:[UIColor lightGrayColor]];
                }];
            } else {
                [UIView animateWithDuration:.25 animations:^{
                    [self.translucentView changeFrame:^(CGRect *f){
                        f->size.width = _signatureDrawView.frame.size.width;
                        f->size.height = _signatureDrawView.frame.size.height;
                        f->origin.y = 0;
                        f->origin.x = 0;
                    }];
                    [self.touchView changeFrame:^(CGRect *f) {
                        f->size.height = 250;
                        f->size.width = _signatureDrawView.frame.size.width;
                        f->origin.y = _signatureDrawView.frame.size.height-250;
                        f->origin.x = 0;
                    }];
                    suggestTextField.hidden = NO;
                    [self.view setBackgroundColor:[UIColor
                    colorWithPatternImage:_defaultbkImage]];
                }];
            }
    }
    stampView.hidden = UIInterfaceOrientationIsLandscape(toInterfaceOrientation);
    [self
    setDrawViewGeometryToLandscape:UIInterfaceOrientationIsLandscape(toInterfaceOrie
    ntation)];
    }
    (void)setDrawViewGeometryToLandscape:(BOOL)isLandscape
    {
    /*
            CGFloat DrawViewPortraitScale = 0.666667;
            if ( UI_USER_INTERFACE_IDIOM( ) == UIUserInterfaceIdiomPad )
            {
                    DrawViewPortraitScale = 0.6666667;
            } else {
                    DrawViewPortraitScale = 0.666667;
            }
            if (isLandscape)
            {
                    drawViewlayer.anchorPoint = CGPointMake(0.5, 0.5);
                    CGSize size = _drawView.bounds.size;
                    drawView.layer.position = CGPointMake(size.width / 2, size.height / 2 +
        _            toolBar.frame.size.height);
                    drawView.transform = CGAffineTransformIdentity:
            } else {
                    drawView.layer.anchorPoint = CGPointMake(0, 0);
                    drawView.layer.position = CGPointMake(0, _toolBar.frame.size.height);
                    drawView.transform =
                    CGAffineTransformMakeScale(DrawViewPortraitScale,
                    DrawViewPortraitScale);
            }
    */
    }
    (BOOL)canBecomeFirstResponder
    {
            return YES;
    }
    (void) motionEnded:(UIEventSubtype)motion withEvent:(UIEvent *)event
    {
    if (motion == UIEventSubtypeMotionShake && _drawView.hasChanged)
            {
                    UIAlertView *alert = [[UIAlertView alloc] initWithTitle:LS(@"Undo
                    Editing?")
                    message:nil
                    delegate:self
                    cancelButtonTitle:LS(@"Cancel")
                    otherButtonTitles:LS(@"Discard"), nil];
                    alert.tag = UndoChangesAlertTag;
                    [alert show];
            }
    }
    @end
```

Figure 2:
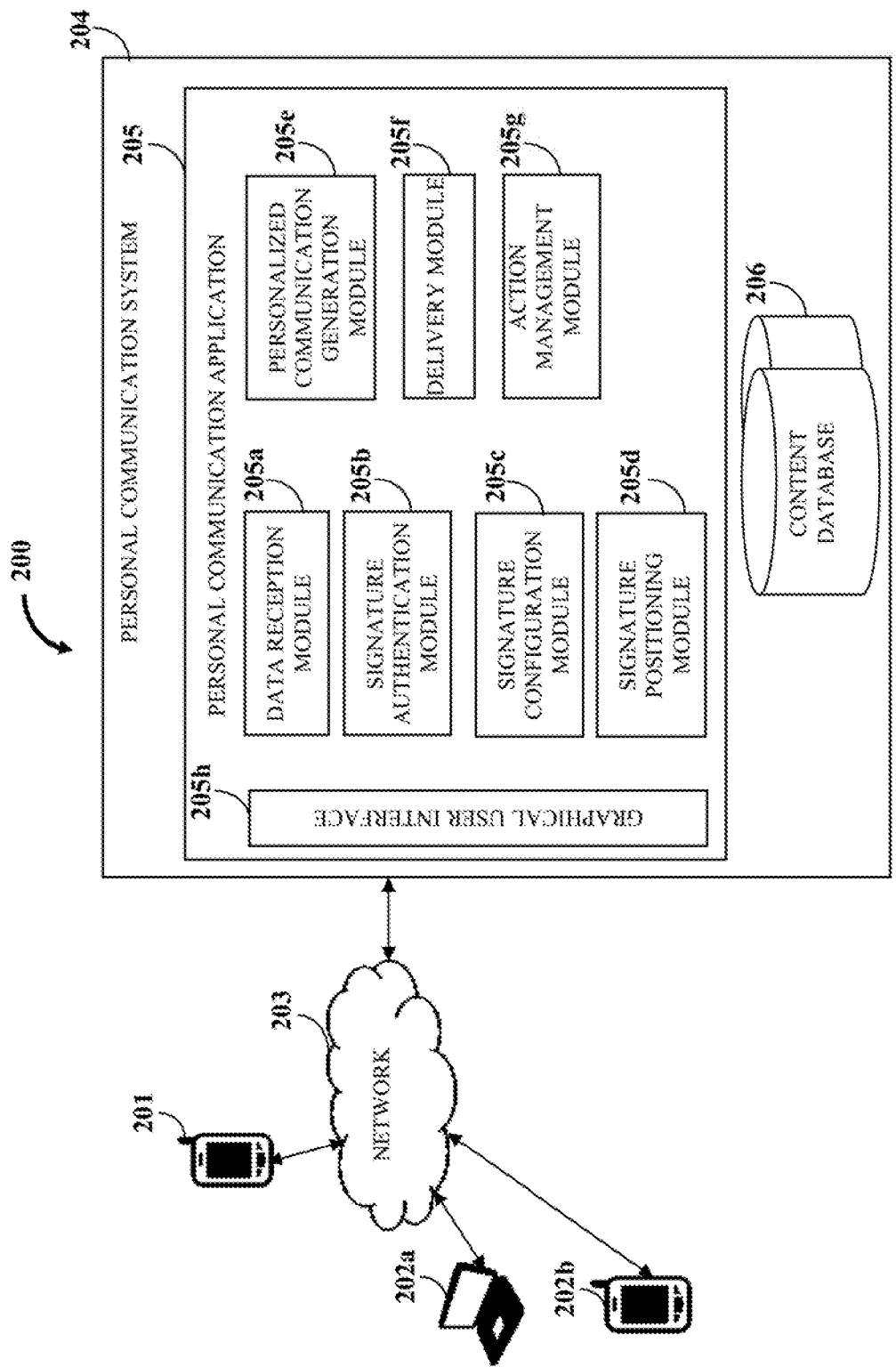
FIG. 2 exemplarily illustrates a computer implemented system for generating and delivering an electronically signed and authenticated personalized communication.

FIG. 2 exemplarily illustrates a computer implemented system 200 for generating and delivering an electronically signed and authenticated personalized communication. The computer implemented system 200 disclosed herein comprises the personal communication system 204 accessible by a sender device 201 and one or more recipient devices 202a and 202b via a network 203. The personal communication system 204 is accessible to the sender device 201 and recipient devices 202a and 202b, for example, through a broad spectrum of technologies and devices such as personal computers with access to the internet, internet enabled cellular phones, tablet computing devices, smart glasses, etc.

The sender device 201 and the recipient devices 202a and 202b can be linear electronic devices or non-linear electronic devices, for example, personal computers, tablet computing devices, mobile computers, mobile phones, smart phones, portable computing devices, laptops, personal digital assistants, wearable devices such as Google Glass of Google Inc., Apple Watch of Apple Inc., etc., touch centric devices, workstations, client devices, portable electronic devices, network enabled computing devices, interactive network enabled communication devices, any other suitable computing equipment, and combinations of multiple pieces of computing equipment. The network 203 for accessing the personal communication system 204 is, for example, the internet, an intranet, a wired network, a wireless network, a communication network, a network that implements of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS)) network, a mobile telecommunication network such as a global system for mobile (GSM) communications network, a code division multiple access (CDMA) network, a third generation (3G) mobile communication network, a fourth generation (4G) mobile communication network, a long-term evolution (LTE) mobile communication network, a public telephone network, etc., a local area network, a wide area network, an internet connection network, an infrared communication network, etc., or a network formed from any combination of these networks.

In an embodiment, the personal communication system 204 is configured as a web based platform, for example, a website hosted on a server or a network of servers. In another embodiment, the personal communication system 204 comprises a personal communication application 205 which is a software application downloadable and usable on the sender device 201 and each of the recipient devices 202a and 202b. In another embodiment, the personal communication system 204 is implemented in a cloud computing environment and provides an open communication community service. As used herein, "cloud computing environment" refers to a processing environment comprising configurable computing physical and logical resources, for example, networks, servers, storage, applications, services, etc., and data distributed over the network 203, for example, the internet. The cloud computing environment provides on-demand network access to a shared pool of the configurable computing physical and logical resources. The personal communication system 204 is developed, for example, using the Google App engine cloud infrastructure of Google Inc., Amazon Web Services® of Amazon Technologies, Inc., the Amazon elastic compute cloud EC2® web service of Amazon Technologies, Inc., the Google® Cloud platform of Google Inc., the Microsoft® Cloud platform of Microsoft Corporation, etc. In an embodiment, the personal communication system 204 is configured as a cloud computing based platform implemented as a service for generating and delivering an electronically signed and authenticated personalized communication.

The personal communication system 204 disclosed herein comprises a non-transitory computer readable storage medium and at least one processor communicatively coupled to the non-transitory computer readable storage medium. As used herein, "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor, except for a transitory, propagating signal. The non-transitory computer readable storage medium is configured to store computer program instructions defined by modules, for example, 205a, 205b, 205c, 205d, 205e, 205f, 205g, etc., of the personal communication system 204. The processor is configured to execute the defined computer program instructions.

In an embodiment, the personal communication application 205 of the personal communication system 204 is configured and coded as a mobile application. The personal communication application 205 is developed to operate within mobile application marketplaces such as iTunes® of Apple Inc., Google Play™ of Google, Inc., etc. As exemplarily illustrated in FIG. 2, the personal communication application 205 comprises a graphical user interface (GUI) 205h. A sender of the personalized communication or a recipient of the personalized communication can access the personal communication application 205 via the GUI 205h. The GUI 205h is, for example, a webpage of a website hosted by the personal communication system 204, an online web interface, a web based downloadable application interface, a mobile based downloadable application interface, etc. The GUI 205h of the personal communication application 205 is interoperable with a web based version of the personal communication system 204. The personal communication application 205 further comprises a data reception module 205a, a signature authentication module 205b, a signature configuration module 205c, a signature positioning module 205d, a personalized communication generation module 205e, a delivery module 205f, and an action management module 205.

The data reception module 205a receives media content and a personal signature composed by a sender from the sender device 201 via the GUI 205h. In an embodiment, the GUI 205h is a touch enabled interface configured to receive a handwritten personal signature composed b the sender through one or more input modes comprising, for example, a manual input mode and a device input mode. In an embodiment, the data reception module 205a stores the received media content in a content database 206 of the personal communication system 204 for current and subsequent generation and delivery of the personalized communication. The content database 206 is any storage area or medium that can be used for storing data and files. The content database 206 is, for example, a structured query language (SQL) data store or a not only SQL (NoSQL) data store such as the Microsoft® SQL Server®, the Oracle® servers, the MySQL® database of MySQL AB Company, the mongoDB® of MongoDB, Inc., the Neo4j graph database of Neo Technology Corporation, the Cassandra database of the Apache Software Foundation, the HBase™ database of the Apache Software Foundation, etc. In an embodiment, the content database 206 can also be a location on a file system. In another embodiment, the content database 206 can be remotely accessed by the personal communication system 204 via the network 203. In another embodiment, the content database 206 is configured as a cloud based database implemented in a cloud computing environment, where computing resources are delivered as a service over the network 203.

The signature authentication module 205b authenticates the received personal signature based on a comparison between biometric input data received from the sender device 201 while receiving the personal signature via the GUI 205h, and biometric identification data associated with the sender device 201. The data reception module 205*a* receives the biometric input data from the sender device 201 for enabling the signature authentication module 205*b* to perform the comparison between the biometric input data received from the sender device 201 and the biometric identification data associated with the sender device 201. In an embodiment, the data reception module 205*a* receives the biometric input data via a home button configured with a touch identification (ID) sensor on the sender device 201. In another embodiment, the data reception module 205*a* receives the biometric input data via the GUI 205*h*. In this embodiment, the GUI 205*h* is a touch sensitive GUI enabled with touch ID technology for detecting the biometric input data, for example, fingerprints of the sender. In this embodiment, the GUI 205*h* comprises a touch ID sensor that obtains a biometric reading of the fingerprint of a finger used by the sender to provide his/her personal signature. The signature authentication module 205*b* extracts fingerprint data from the obtained biometric reading. The signature, authentication module 205*b* retrieves the biometric identification data, for example, a touch ID access code stored in the sender device 201 for unlocking the sender device 201. The signature authentication module 205*b* compares the extracted fingerprint data with the retrieved biometric identification data to authenticate the received personal signature as an autograph of the sender.

The signature configuration module 205*c* configures one or more of multiple parameters of the received personal signature based on one or more sender preferences, while maintaining; the integrity and originality of the received personal signature. The signature configuration module 205*c* maintains the integrity and originality of the received personal signature by maintaining a font style of the received personal signature irrespective of a change in the sender preferences. The action management module 205*g* facilitates performance of one or more actions, for example, reviewing, modifying, approving, deleting, etc., the personal signature based on one or more action inputs that the data reception module 205*a* receives from the sender device 201.

The signature positioning module 205*d* positions the authenticated personal signature with the configured parameters in a predefined section of the received media content. The signature authentication module 205*b* assigns an authentication indicator proximal to the positioned personal signature or the received media content for indicating an authenticated status of the received personal signature. The personalized communication generation module 205*e* generates a personalized communication comprising the received media content with the positioned personal signature. The delivery module 205*f* delivers the generated personalized communication with the positioned personal signature to one or more recipients and/or recipient devices 202*a* and 202*b* via one or more of multiple delivery modes. In an embodiment, the delivery module 205*f* delivers the generated personalized communication with the positioned personal signature to the recipients and/or recipient devices 202*a* and 202*b* when an optimal time condition defining a minimum time required for composing the personalized communication is met.

Figure 3:
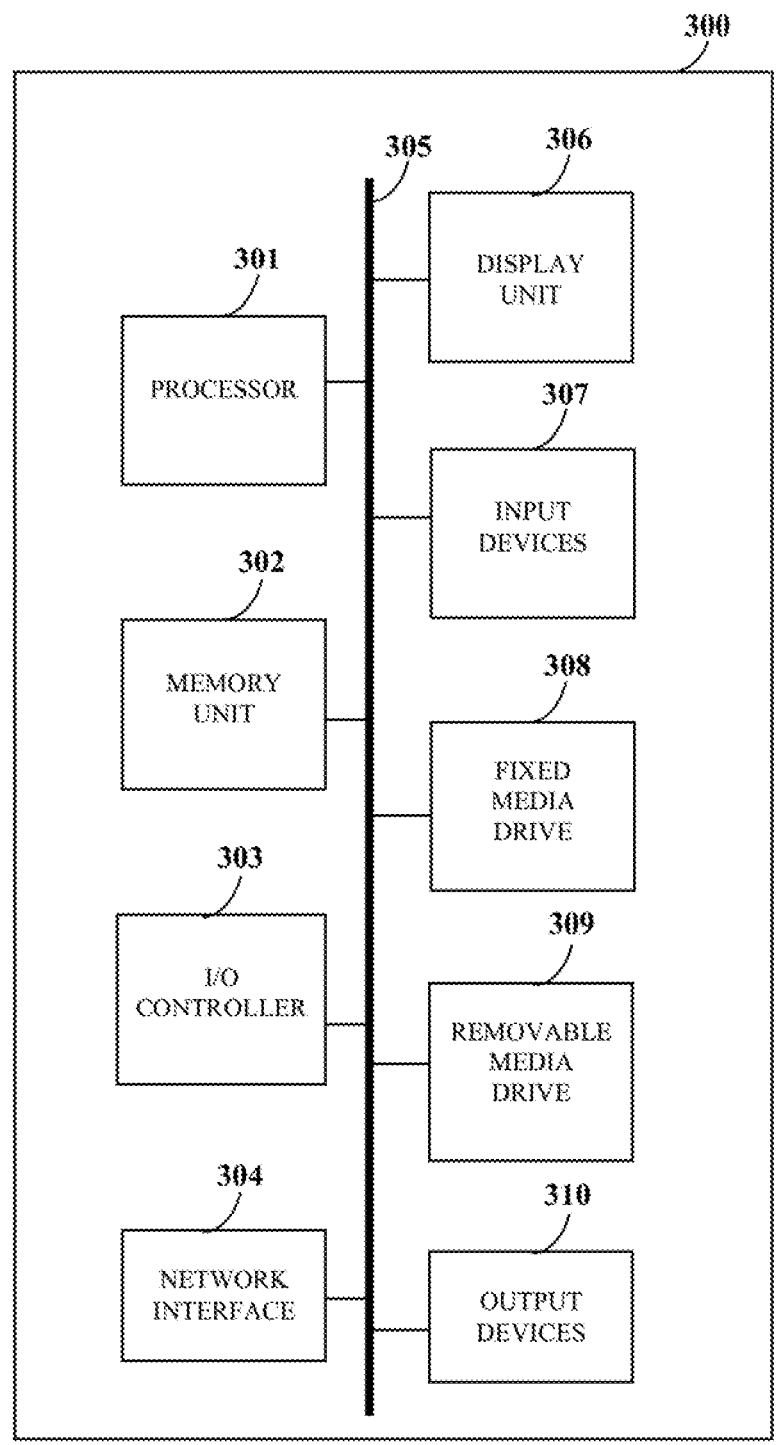
FIG. 3 exemplarily illustrates the architecture of a computer system employed by a personal communication system for generating and delivering an electronically signed and authenticated personalized communication.
Figure 4A:
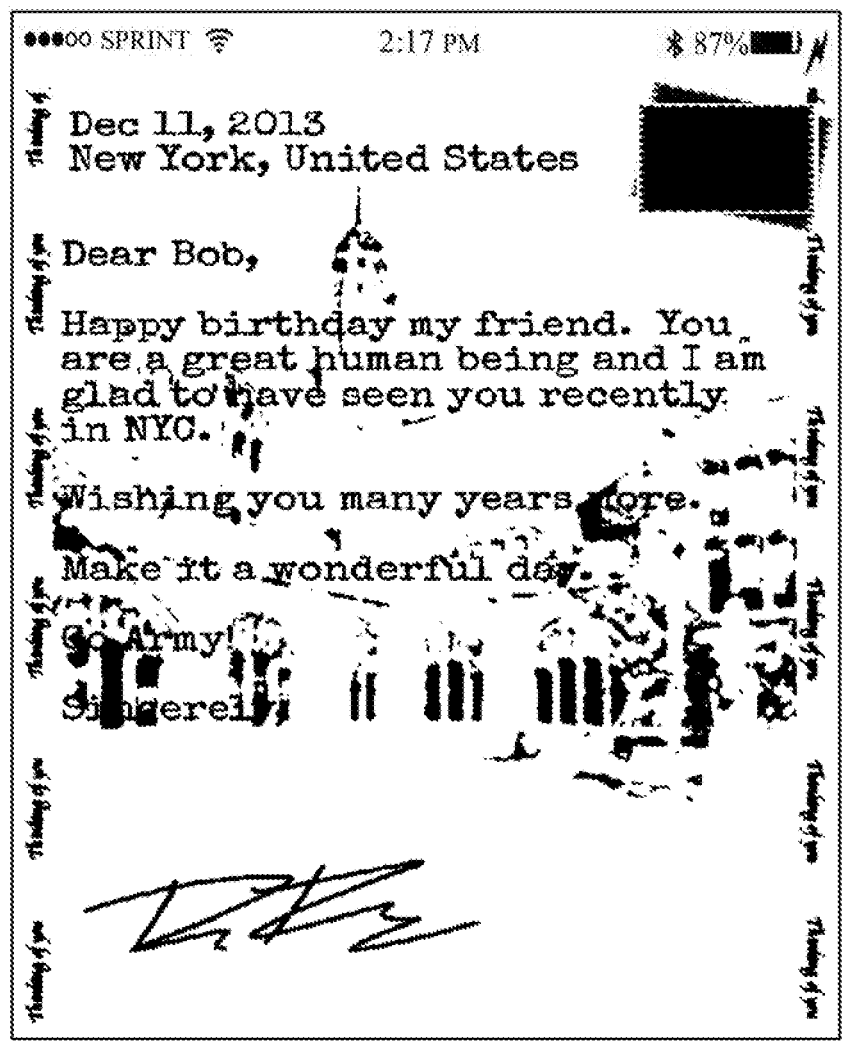
FIGS. 4A-4F exemplarily illustrate examples of electronically signed and authenticated personalized communications generated by the personal communication system.
Figure 4B:
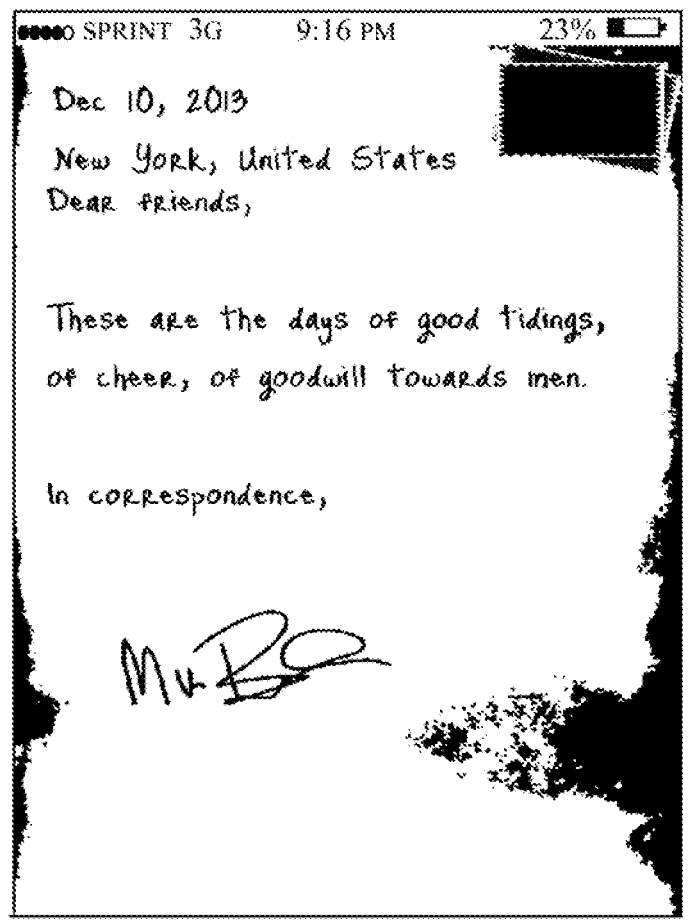
Figure 4C:
Figure 4D:
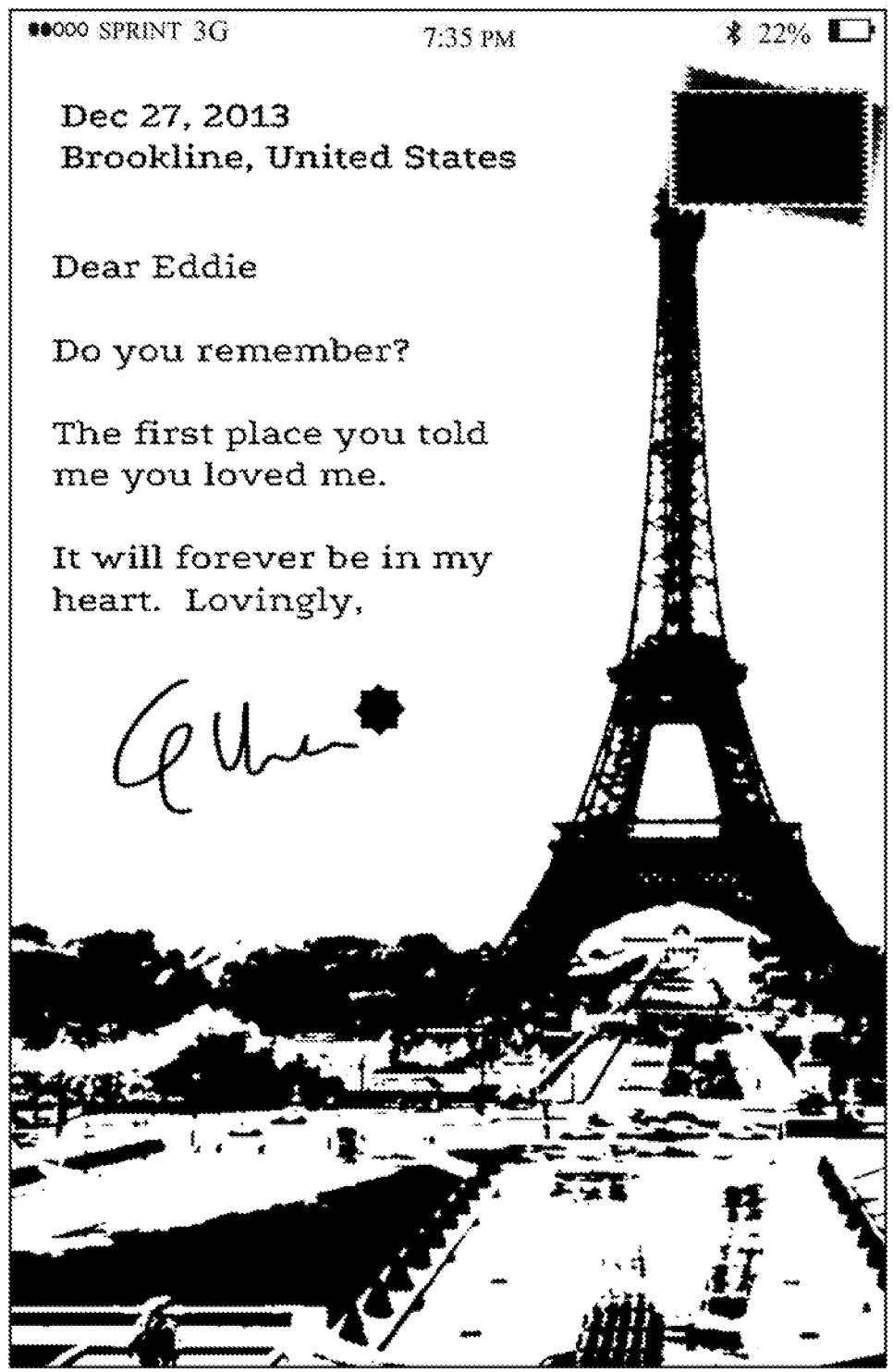
Figure 4E:
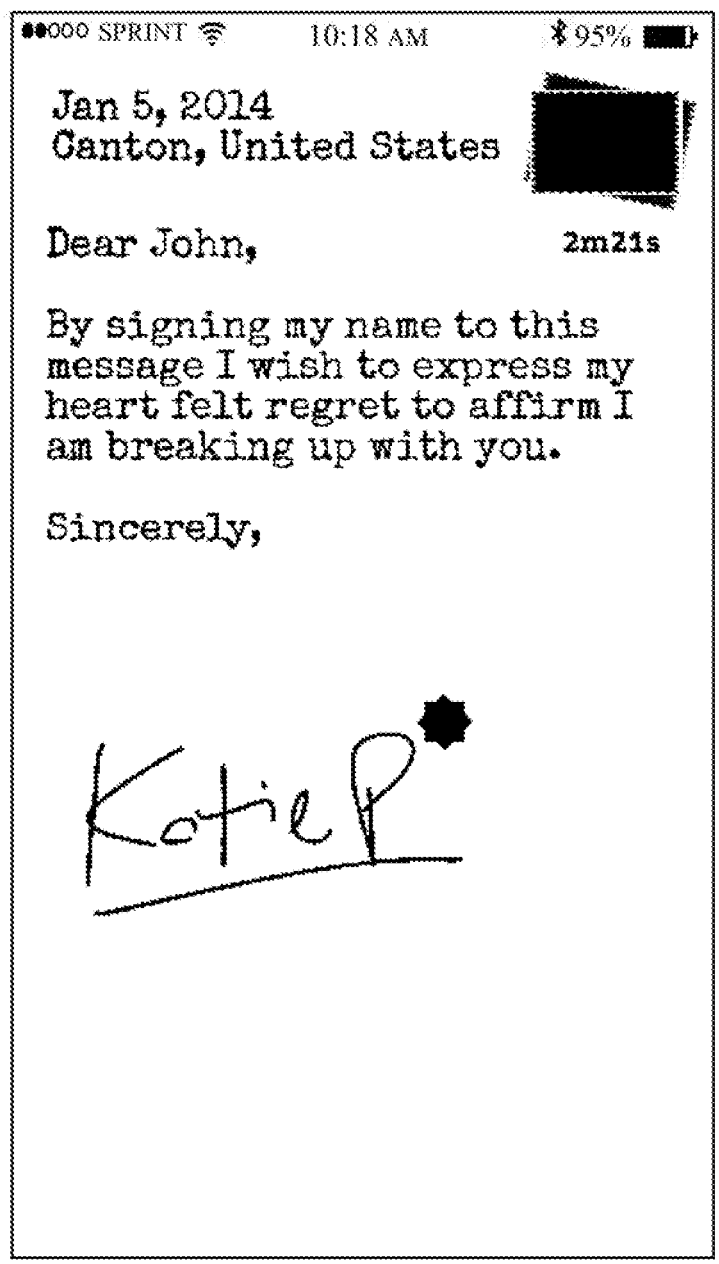
Figure 4F:
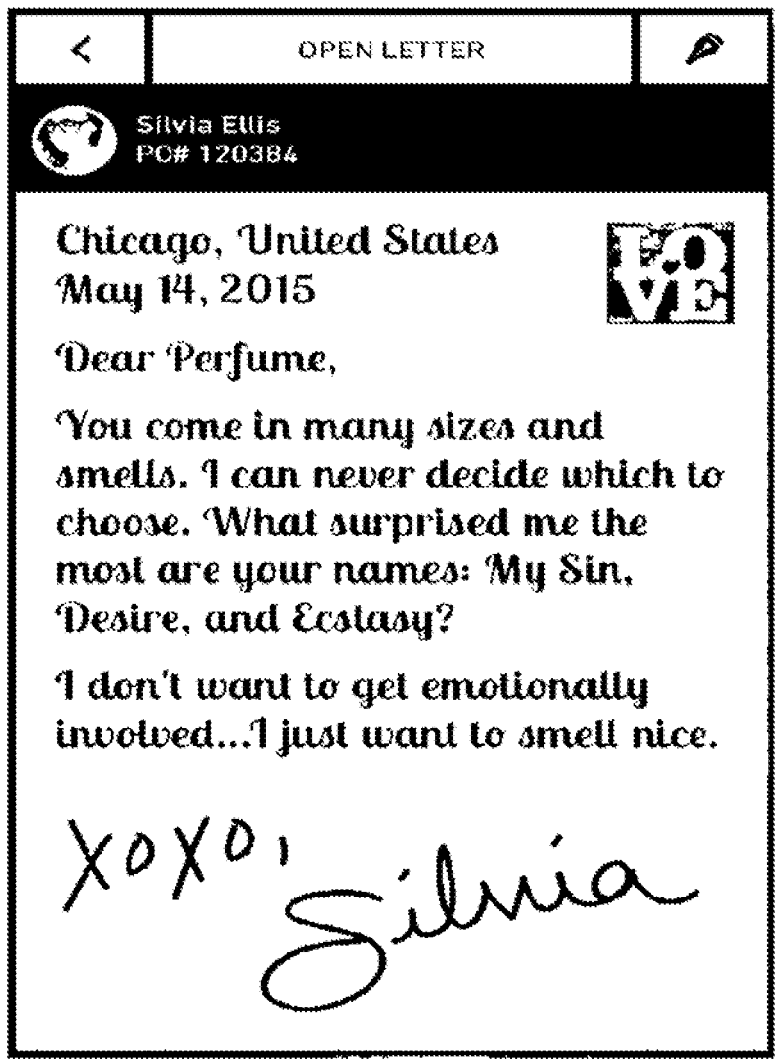

FIG. 3 exemplarily illustrates the architecture of a computer system 300 employed by the personal communication system 204 exemplarily illustrated in FIG. 2, for generating and delivering an electronically signed and authenticated personalized communication. The personal communication system 204 of the computer implemented system 200 exemplarily illustrated in FIG. 2, employs the architecture of the computer system 300 exemplarily illustrated in FIG. 3. The computer system 300 is programmable using a high level computer programming; language. The computer system 300 may be implemented using programmed and purposeful hardware. The personal communication system 204 communicates with a sender device 201, recipient devices 202*a* and 202*b*, etc., registered with the personal communication system 204 via a network 203 exemplarily illustrated in FIG. 2, for example, a short range network or a long range network, etc.

As exemplarily illustrated in FIG. 3, the computer system 300 comprises a processor 301, a non-transitory computer readable storage medium such as a memory unit 302 for storing programs and data, an input/output (I/O) controller 303, a network interface 304, a data bus 305, a display unit 306, input devices 307, a fixed media drive 308 such as a hard drive, a removable media drive 309 for receiving removable media, output devices 310, etc. The processor 301 refers to any one or more microprocessors, central processing unit (CPU) devices, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions. The processor 301 may also be implemented as a processor set comprising, for example, a general purpose microprocessor and a math or graphics co-processor. The processor 301 is selected, for example, from the Inter® processors such as the Itanium® microprocessor or the Pentium® processors. Advanced Micro Devices (AMD®) processors such as the Athlon® processor, UltraSPARC® processors, microSPARC® processors, Hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The personal communication system 204 disclosed herein is not limited to a computer system 300 employing a processor 301. The computer system 300 may also employ a controller or a microcontroller. The processor 301 executes the modules, for example, 205*a*, 205*b*, 205*6e*, 205*d*, 205*e*, 205*f*, 205*g*, etc., of the personal communication system 204.

The memory unit 302 is used for storing programs, applications, and data. For example, the data reception module 205*a*, the signature authentication module 205*b*, the signature configuration module 205*c*, the signature positioning module 205*d*, the personalized communication generation module 205*e*, the delivery module 205*f*, the action management module 205*g*, etc., of the personal communication system 204 are stored in the memory unit 302 of the computer system 300. The memory unit 302 is, for example, a random access memory (RAM) or another type of dynamic storage device that stores information and instructions for execution by the processor 301. The memory unit 302 also stores temporary variables and other intermediate information used during execution of the instructions by the processor 301. The computer system 300 further comprises a read only memory (ROM) or another type of static storage device that stores static information and instructions for the processor 301. The I/O controller 303 controls input actions and output actions performed by the personal communication system 204.

The network interface 304 enables connection of the computer system 300 to the network 203. For example, the personal communication system 204 connects to the network 203 via the network interface 304. In an embodiment, the network interface 304 is provided as an interface card also referred to as a line card. The network interface 304 comprises, for example, one or more of an infrared (IR) interface, an interface implementing Wi-Fi® of Wi-Fi Alliance Corporation, a universal serial bus (USB) interface, a FireWire® interface of Apple Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, and Ethernet communication interfaces, asynchronous transfer mode (ATM) interfaces, a high speed serial interface (HSSI), a fiber distributed data interface (FDDI), interfaces based on transmission control protocol (TCP)/internet protocol (IP), interfaces based on wireless communications technology such as satellite technology, radio frequency (RE) technology, near field communication, etc. The data bus 305 permits communications between the modules, for example, 205a, 205b, 205c, 205d, 205e, 205f, 205g, 205h, 206, etc., of the personal communication system 204.

The display unit 306, via the graphical user interface (GUI) 205h, displays information, display interfaces, user interface elements such as text fields, checkboxes, text boxes, windows, etc., for allowing a sender of the personalized communication to provide his/her personal signature, media content, etc., for displaying an, authentication indicator proximal to the authenticated personal signature, for displaying a timer counter counting time spent on composition of the personalized communication, etc. The display unit 306 comprises, for example, a liquid crystal display, a plasma display, an organic light emitting diode (MED) based display, etc. The input devices 307 are used for inputting data into the computer system 300. An administrator of the personal communication system 204 uses the input devices 307 to provide inputs to the personal communication system 204. For example, the administrator can configure initial settings for the parameters such as ink color, font color, etc., for a specific theme for the personalized communication using the input devices 307. The input devices 307 are, far example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc.

Computer applications and programs are used for operating the computer system 300. The programs are loaded onto the fixed media drive 308 and into the memory unit 302 of the computer system 300 via the removable media drive 309. In an embodiment, the computer applications and programs may be loaded directly via the network 203. Computer applications and programs are executed by double clicking a related icon displayed on the display unit 306 using one of the input devices 307. The output devices 310 output the results of operations performed by the personal communication system 204. For example, the personal communication system 204 provides reports based on number of times a specific theme is selected for configuring the personal signature, number of times and names of recipients to whom a personal signature is sent as an autograph, etc., using the output devices 310. The personal communication system 204 displays the reports using the output devices 310.

The processor 301 executes an operating system, for example, the Linux® operating system, the Unix® operating system, any version of the Microsoft® Windows® operating system, the Mac OS of Apple Inc., the IBM® OS/2, VxWorks® of Wind River Systems, Inc., QNX. Neutrino® developed by QNX. Software Systems Ltd., Palm OS®, the Solaris operating system developed by Sun Microsystems, Inc., the Android operating system, the Windows Phone® operating system of Microsoft Corporation, the BlackBerry® operating system of BlackBerry Limited, the iOS operating system of Apple Inc., the Symbian™ operating system of Symbian Foundation Limited, etc. The computer system 300 employs the operating system for performing multiple tasks. The operating system is responsible for management and coordination of activities and sharing of resources of the computer system 300. The operating system further manages security of the computer system 300, peripheral devices connected to the computer system 300, and network connections. The operating system employed on the computer system 300 recognizes, for example, inputs provided by the senders using one of the input devices 307, the output display, files, and directories stored locally on the fixed media drive 308. The operating system on the computer system 300 executes different programs using the processor 301. The processor 301 and the operating system together define a computer platform for which application programs in high level programming languages are written.

The processor 301 of the computer system 300 employed by the personal communication system 204 retrieves instructions defined by the data reception module 205a, the signature authentication module 205b, the signature configuration module 205c, the signature positioning module 205d, the personalized communication generation module 205e, the delivery module 205f, the action management module 205g, etc., of the personal communication system 204 for performing respective functions disclosed in the detailed description of FIG. 2. The processor 301 retrieves instructions for executing the modules, for example, 205a, 205b, 205c, 205d, 205e, 205f, 205g, etc., of the personal communication system 204 from the memory unit 302. A program counter determines the location of the instructions in, the memory, unit 302. The program counter stores a number that identifies the current position in the program of each of the modules, for example, 205a, 205b, 205e, 205d, 205e, 205f, 205g, etc., of the personal communication system 204. The instructions fetched by the processor 301 from the memory unit 302 after being processed are decoded. The instructions are stored in an instruction register in the processor 301. After processing and decoding, the processor 301 executes the instructions, thereby performing one or more processes defined by those instructions.

At the time of execution, the instructions stored in the instruction register are examined to determine the operations to be performed. The processor 301 then performs the specified operations. The operations comprise arithmetic operations and logic operations. The operating system performs multiple routines for performing a number of tasks required to assign the input devices 307, the output devices 310, and memory for execution of the modules, for example, 205a, 205b, 205e, 205d, 205e, 205f, 205g, etc., of the personal communication system 204. The tasks performed by the operating system comprise, for example, assigning memory to the modules, for example, 205a, 205b, 205c, 205d, 205e, 205f, 205g, etc., of the personal communication system 204, and to data used by the personal communication system 204, moving data between the memory unit 302 and disk units, and handling input/output operations. The operating system performs the tasks on request by the operations and after performing the tasks, the operating system transfers the execution control back to the processor 301. The processor 301 continues the execution to obtain one or more outputs. The outputs of the execution of the modules, for example, 205a, 205b, 205c, 205d, 205e, 205f, 205g, etc., of the personal communication system 204 are displayed to the sender on the GUI 205h.

For purposes of illustration, the detailed description refers to the personal communication system 204 being run locally on the computer system 300; however the scope of the computer implemented method and system 200 disclosed herein is not limited to the personal communication system 204 being run locally on the computer system 300 via the operating system and the processor 301, but may be extended to run remotely over the network 203 by employing a web browser and a remote server, a mobile phone, or other electronic devices. One or more portions of the computer system 300 may be distributed across one or more computer systems (not shown) coupled to the network 203.

Disclosed herein is also a computer program product comprising a non-transitory computer readable storage medium that stores computer program codes comprising instructions executable by at least one processor 301 for generating and delivering an electronically signed and authenticated personalized communication. The computer program product comprises a first computer program code for receiving media content and a personal signature composed by a sender from a sender device 201 via the GUI 205h; a second computer program code for authenticating the received personal signature; a third computer program code for configuring one or more of multiple parameters of the received personal signature based on one or more sender preferences, while maintaining the integrity and originality of the received personal signature; a fourth computer program code for positioning the authenticated personal signature with the configured parameters in a predefined section of the received media content; a fifth computer program code for generating a personalized communication comprising the received media content with the positioned personal signature; and a sixth computer program code for delivering the generated personalized communication with the positioned personal signature to one or more recipients via one or more of multiple delivery modes. The second computer program code performs authentication of the received personal signature by comparing biometric input data received from the sender device 201 while receiving the personal signature via the GUI 205h, with biometric identification data associated with the sender device 201. The computer program product disclosed herein further comprises one or more additional computer program codes for performing additional steps that may be required and contemplated for generating and delivering an electronically signed and authenticated personalized communication. In an embodiment, a single piece of computer program code comprising computer executable instructions performs one or more steps of the computer implemented method disclosed herein for generating and delivering an electronically signed and authenticated personalized communication.

The computer program codes comprising computer executable instructions are embodied on the non-transitory computer readable storage medium. The processor 301 of the computer system 300 retrieves these computer executable instructions and executes them. When the computer executable instructions are executed by the processor 301, the computer executable instructions cause the processor 301 to perform the steps of the computer implemented method for generating and delivering an electronically signed and authenticated personalized communication.

FIGS. 4A-4F exemplarily illustrate examples of electronically signed and authenticated personalized communications generated by the personal communication system 204 exemplarily illustrated in FIG. 2. The personal communication system 204 converts a handwritten signature of a sender into a computer generated personal signature and applies the personal signature to a predefined section, for example, at the bottom of a personalized communication composed by the sender as exemplarily illustrated in FIGS. 4A-4F. The personal communication system 204 further authenticates the personal signature and assigns an authentication indicator, for example, a star, proximal to the personal signature on the personalized communication as exemplarily illustrated in FIGS. 4D-4E, for indicating an authenticated status of the personal signature. The personalized communication bundled with the authenticated personal signature is deliverable within the personal communication system 204 via one or more delivery modes, for example, digital mail, postal mail, a short message service (SMS), etc.

Figure 5A:
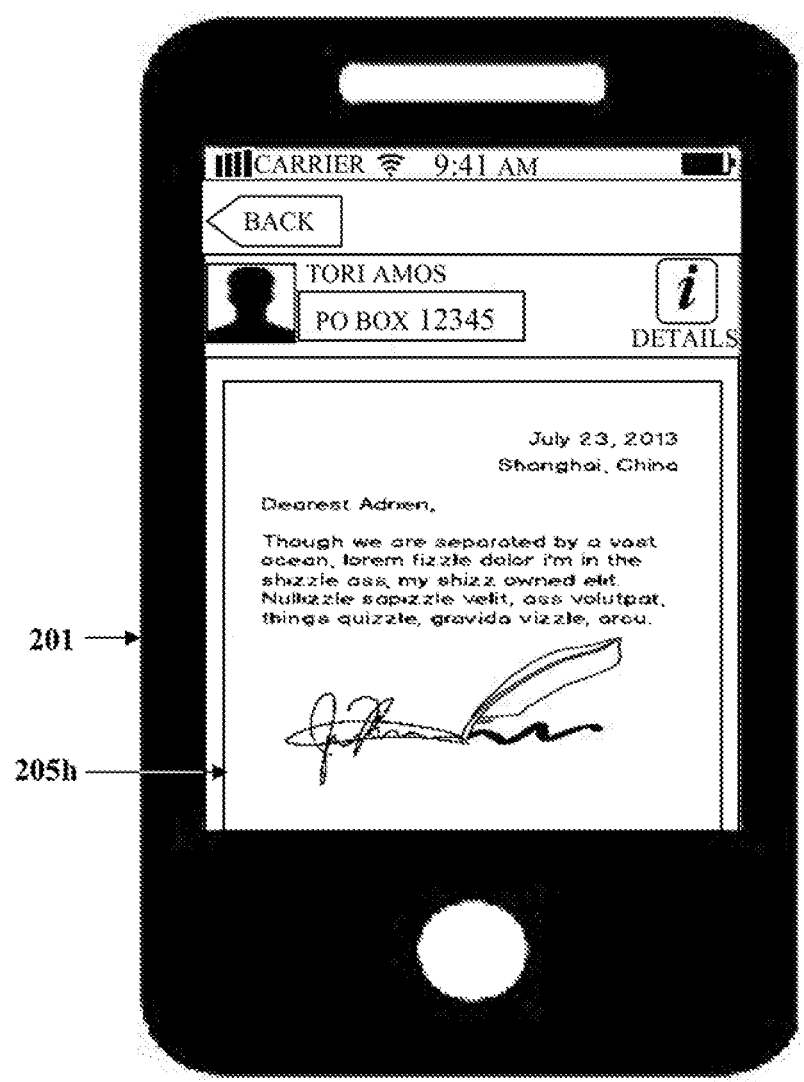
FIGS. 5A-5N exemplarily illustrate screenshots of a graphical user interface provided by the personal communication system on a sender device for generating and configuring a personal signature, authenticating the personal signature, and delivering an electronically signed and authenticated personalized communication to a recipient.
Figure 5B:
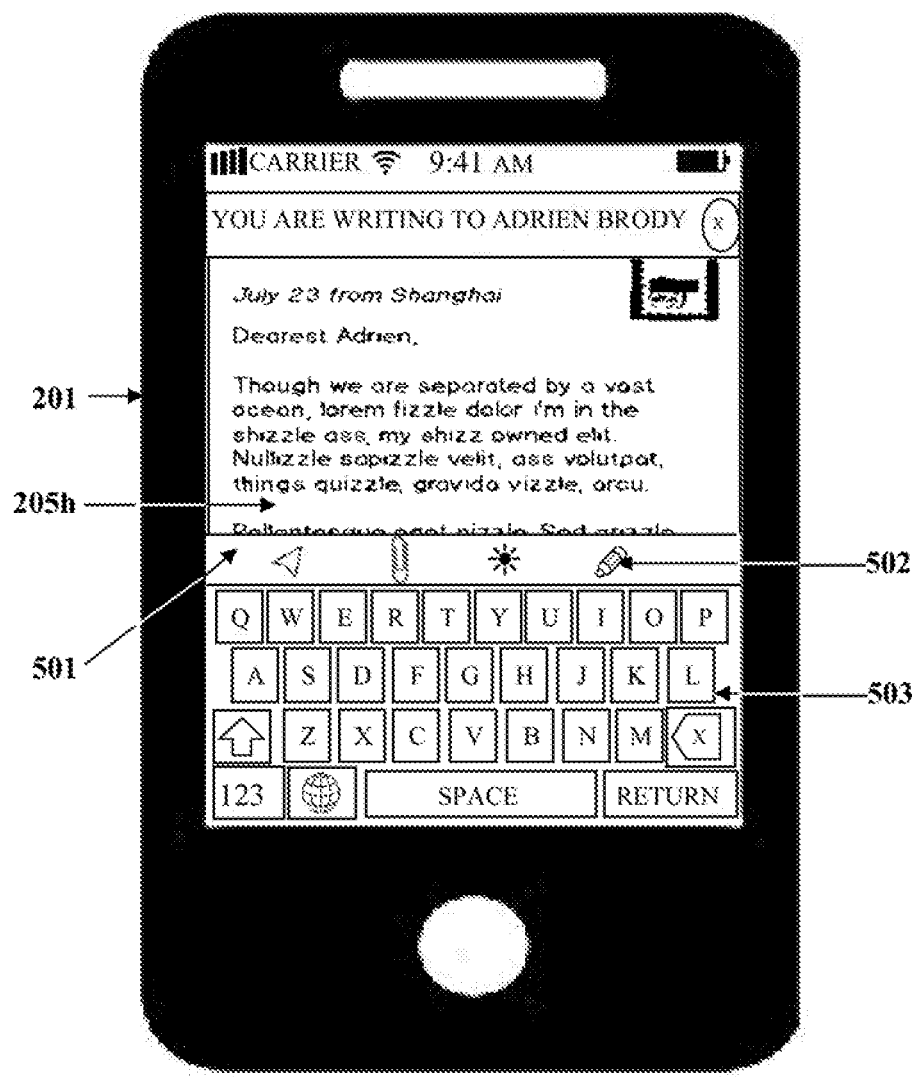
Figure 5C:
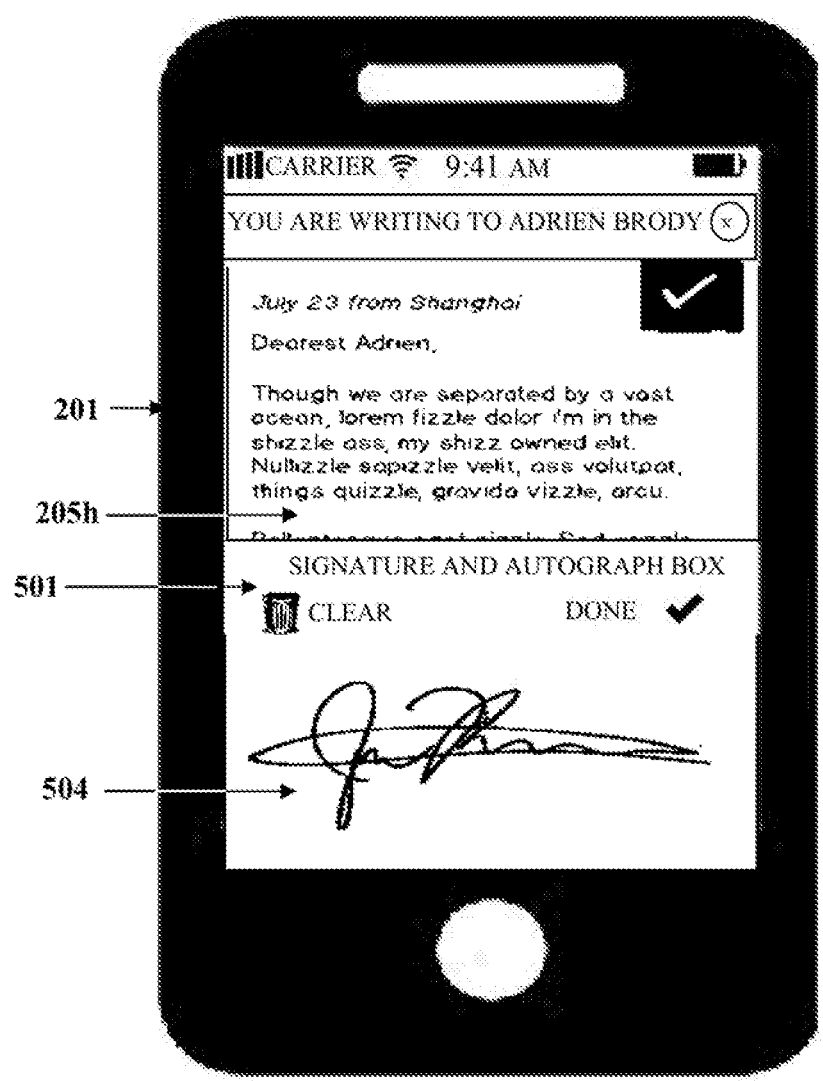
Figure 5D:
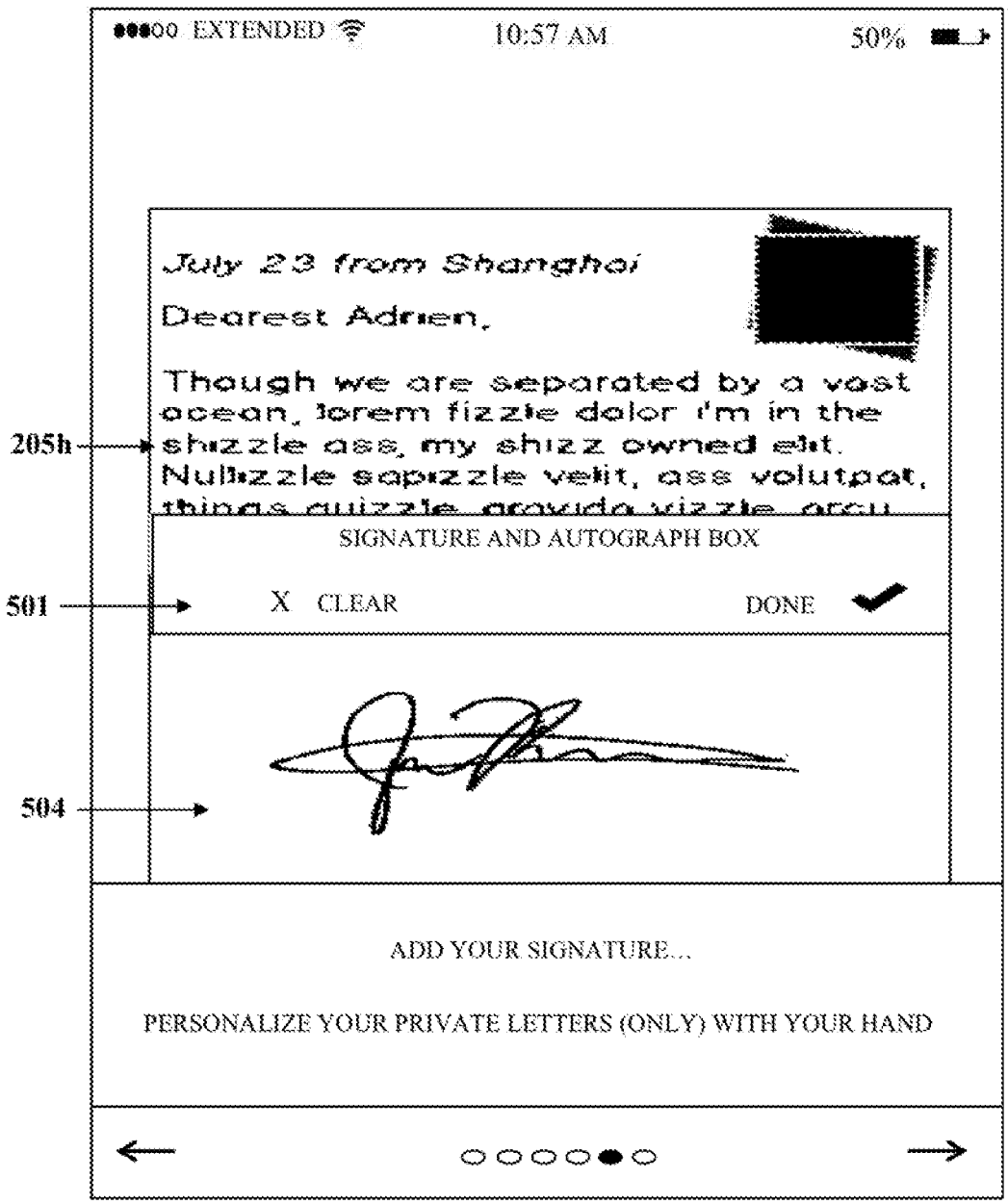
Figure 5E:
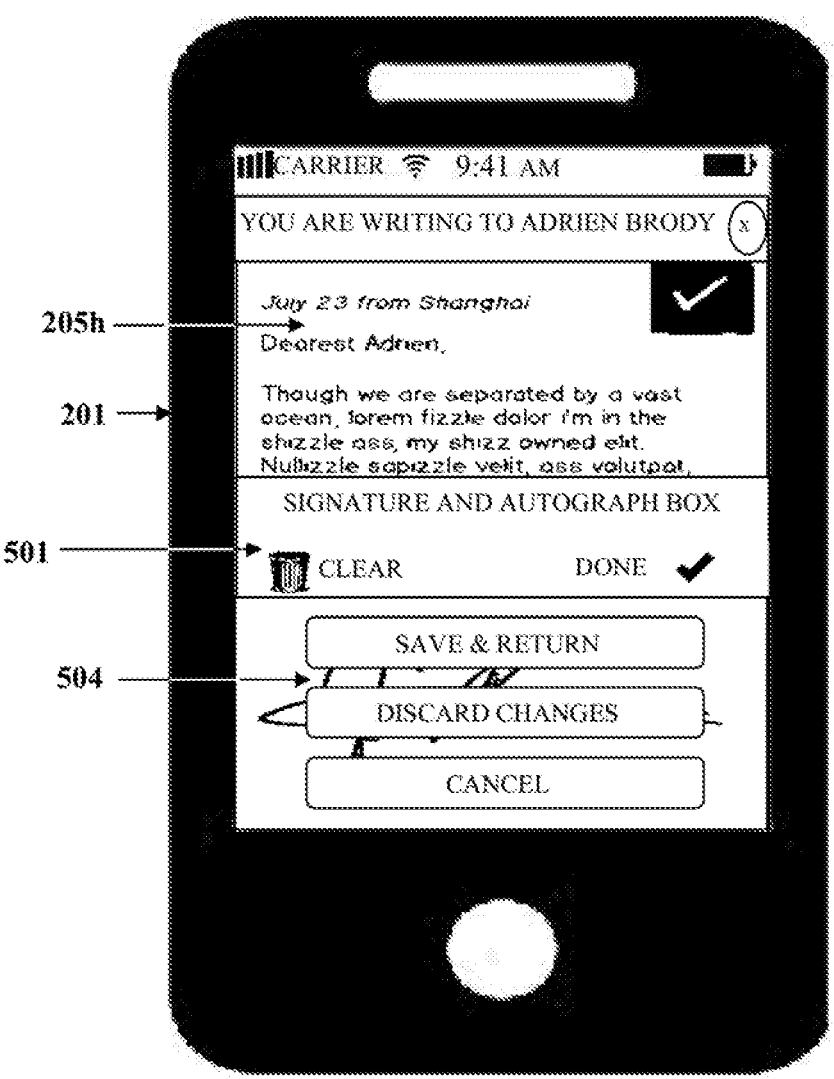
Figure 5F:
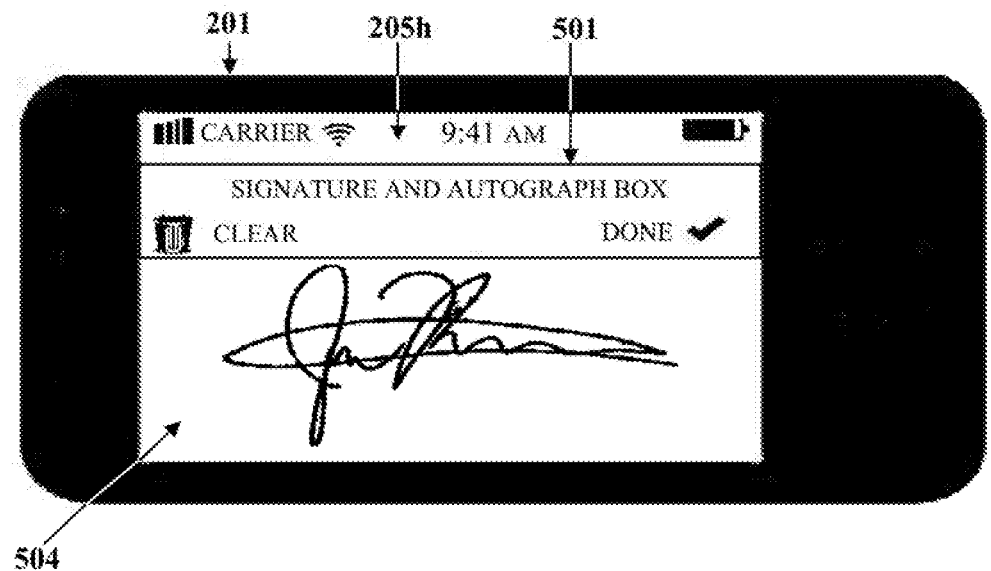
Figure 5G:
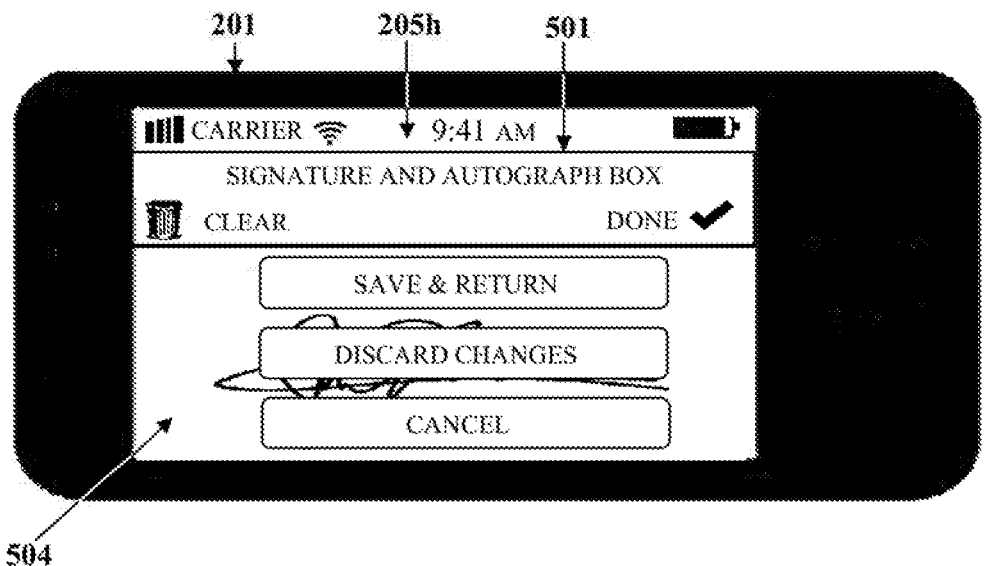
Figure 5H:
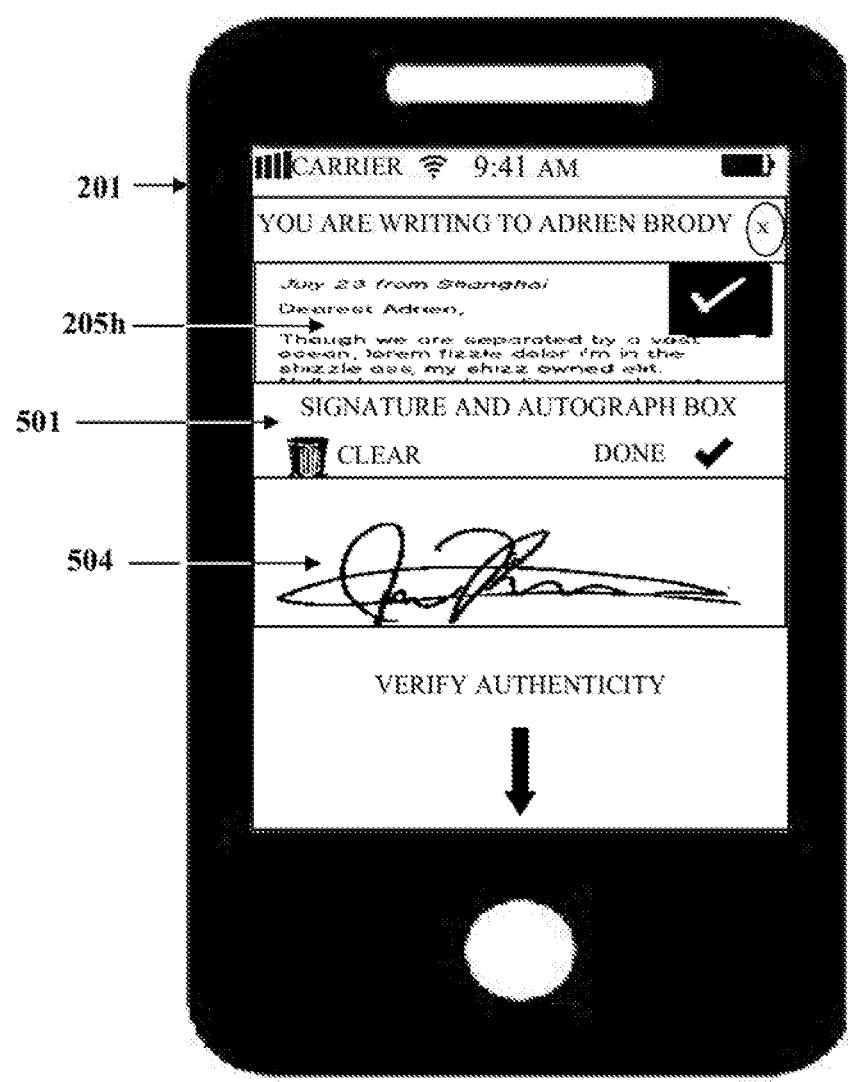
Figure 5I:
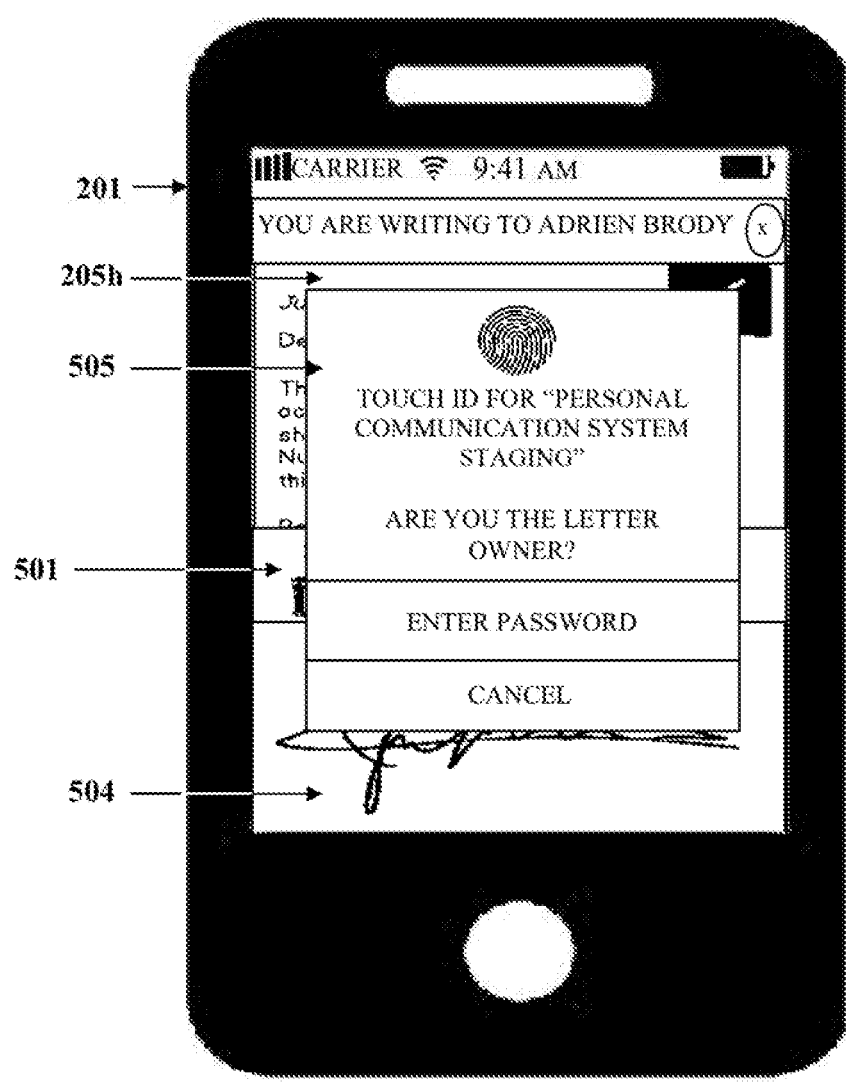
Figure 5J:
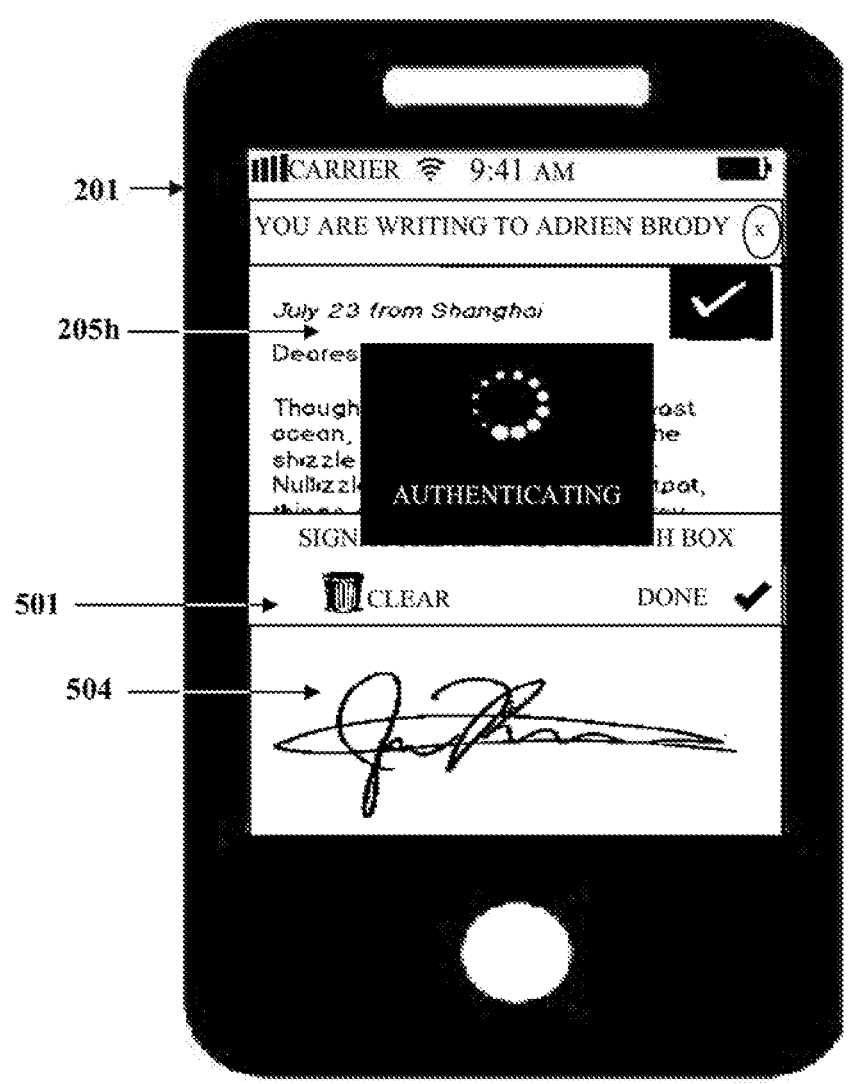
Figure 5K:
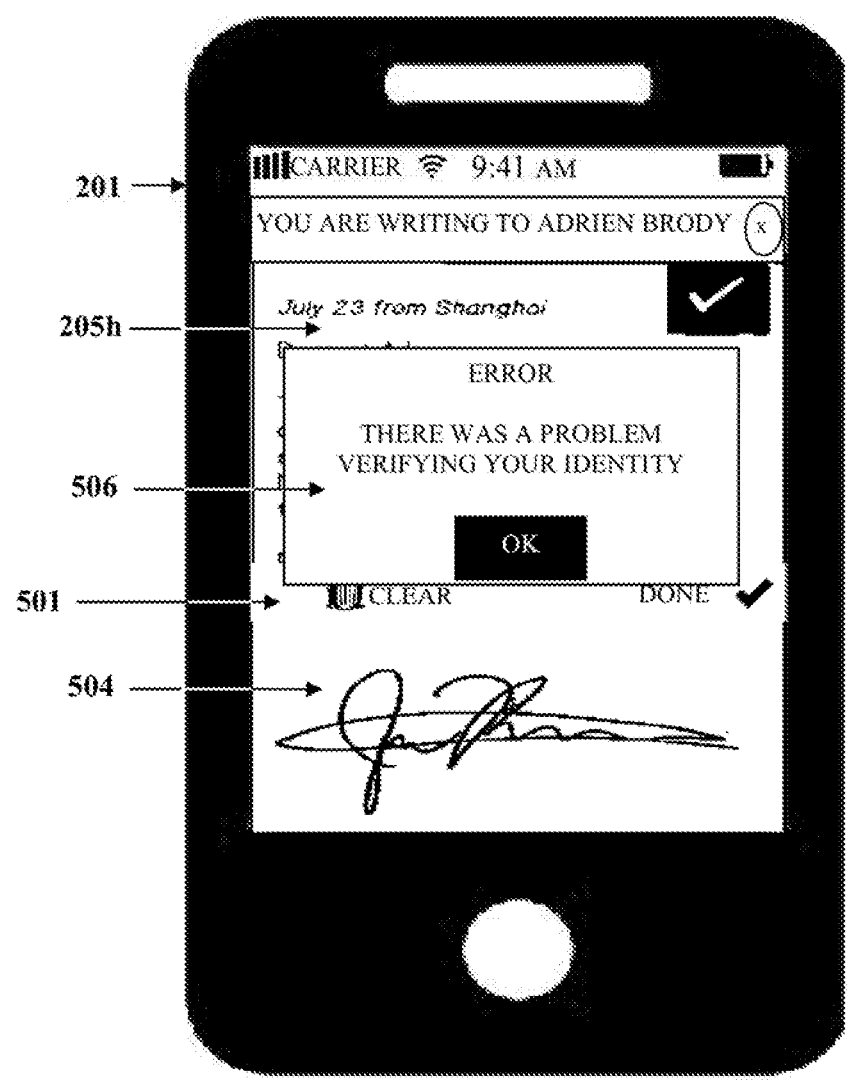
Figure 5L:
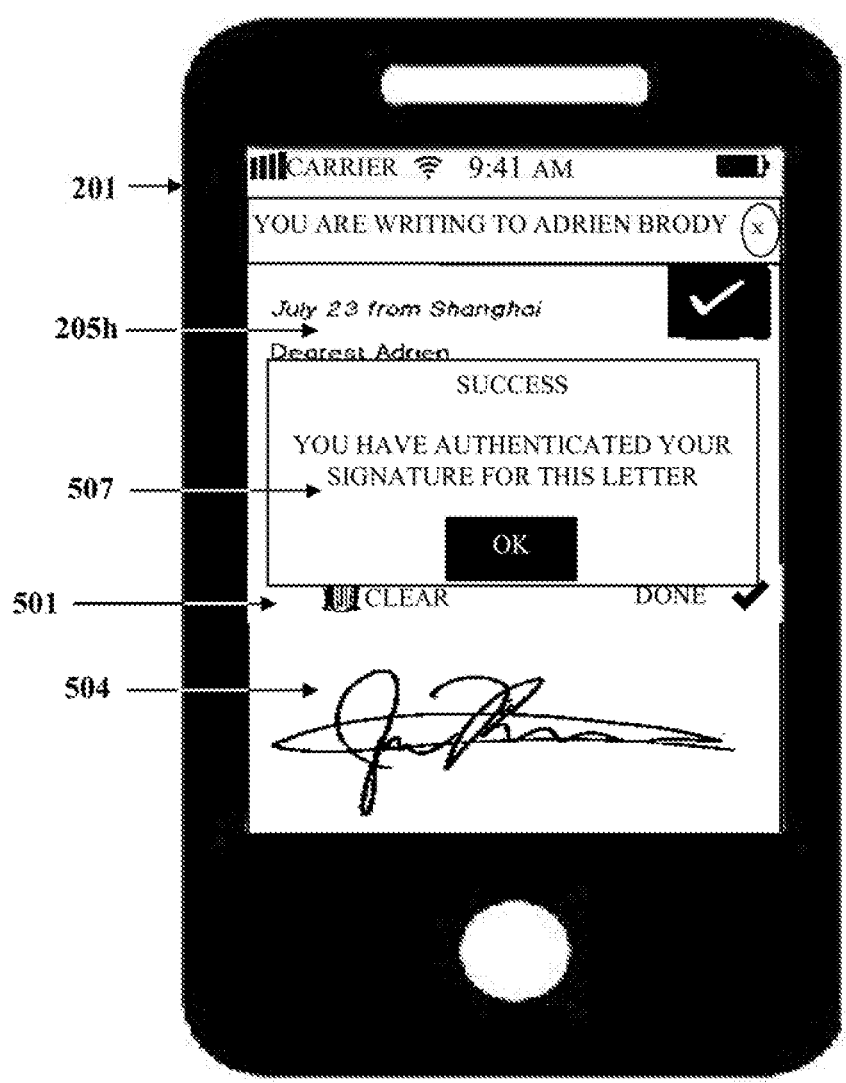
Figure 5M:
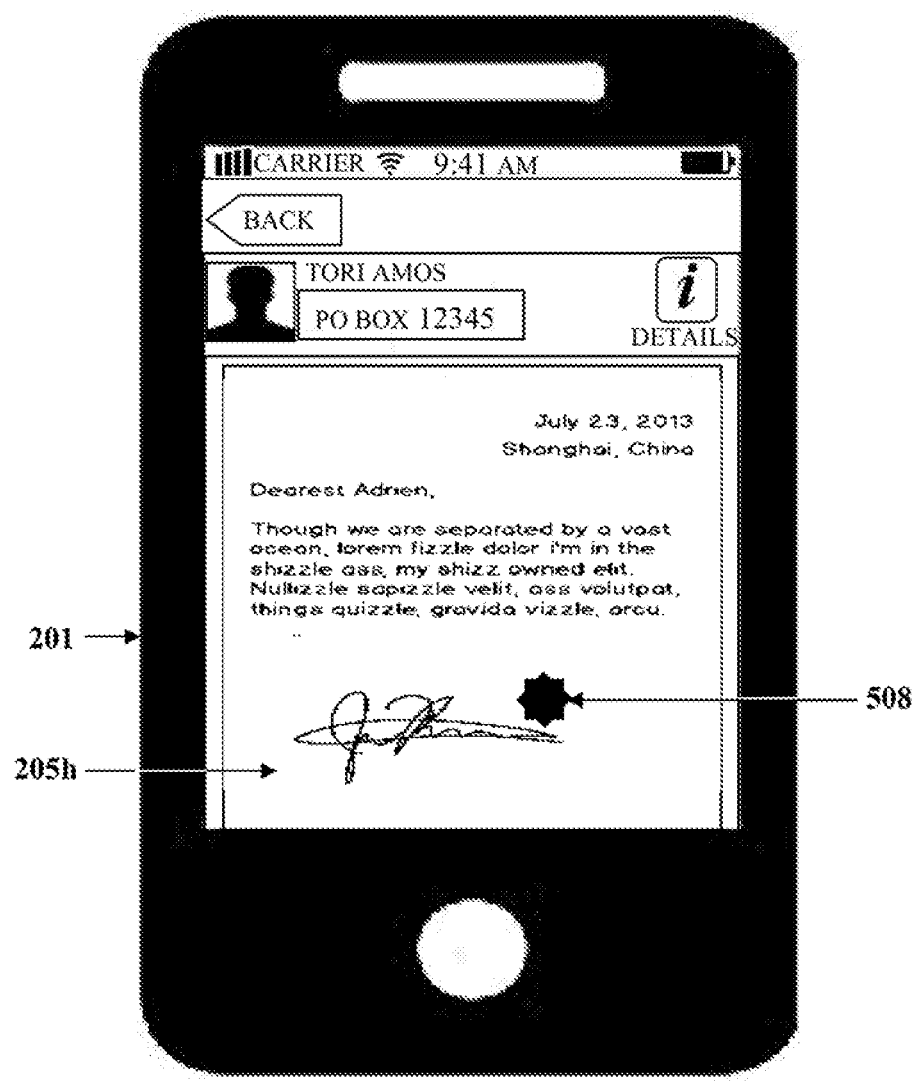
Figure 5N:
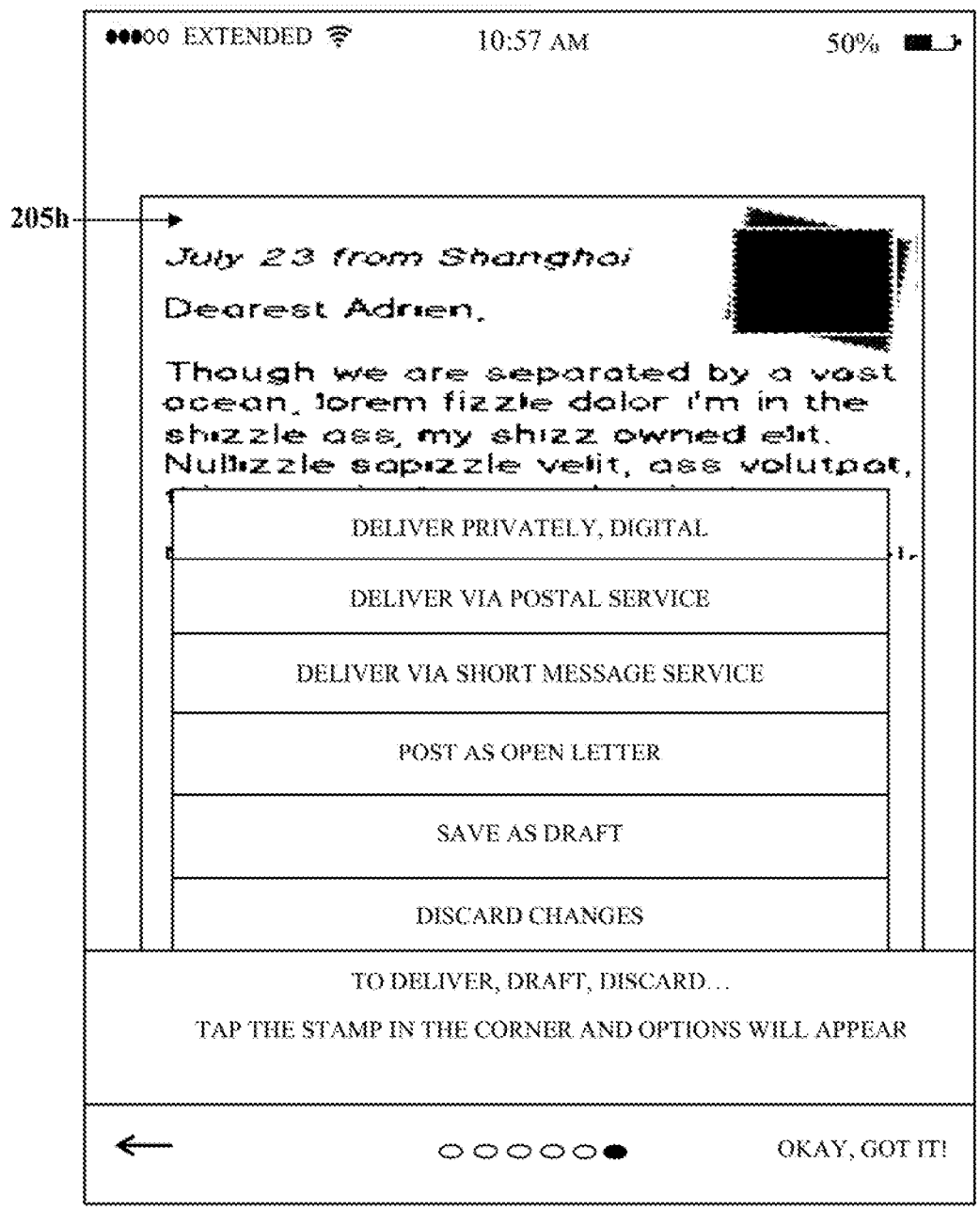

FIGS. 5A-5N exemplarily illustrate screenshots of, a graphical user interface (GUI) 205h provided by the personal communication system 204 exemplarily illustrated in FIG. 2, on a sender device 201 for generating and configuring a personal signature, authenticating the personal signature, and delivering an electronically signed and authenticated personalized communication to a recipient. In an embodiment, the personal communication system 204 is incorporated in the sender device 201. The personal communication system 204 comprises the personal communication application 205 exemplarily illustrated in FIG. 2, downloadable on the sender device 201. FIG. 5A exemplarily illustrates a screenshot of the GUI 205h displayed on the sender device 201, for example, a mobile device showing an electronically signed personalized communication. The personal communication system 204 generates a personalized communication from media content received from the sender and positions a personal signature composed by the sender in a predefined section of the media content as disclosed in the detailed description of FIG. 1.

FIG. 58 exemplarily illustrates a screenshot of a write interface section 501 provided by the personal communication system 204 on the GUI 205h, showing a personal signature icon 502 and an on-screen keyboard 503. In an embodiment, the write interface section 501 provides links for digital and/or physical customization of a personalized communication. The write interface section 501 provides links, for example, for delivery of seasonal gift items along with a personalized communication, a list of digital themes, a list of fonts, a list of font colors, ink stamp options, handwritten tagline options, proofreading options, design consultation options, an option to add a personalized communication to a sender's or a recipient's favorite personalized communications collection, an option to draft a personalized communication using on-screen keyboard 503, an option to deliver a personalized communication, an option to change a clock type, or set time parameters, or change clock settings, an option to authenticate the personal signature as an autograph of the sender, etc. The write interface section 501 is configured, for example, as a signature personalization box that the personal communication system 204 renders to a sender, to receive an original personal signature of the sender, configure the received personal signature, and authenticate the received personal signature as an autograph of the sender. When the sender clicks the personal signature icon 502 on the write interface section 501, the personal communication system 204 opens an edit window 504 to allow the sender to create and review the personal signature as exemplarily illustrated in FIGS. 5C-5D. Once the sender creates the personal signature, the personal communication system 204 enables the sender to accept and save the personal signature, discard the changes made to the personal signature, or cancel the personal signature in the edit window 504 as exemplarily illustrated in FIG. 5E.

FIGS. 5F-5G exemplarily illustrate landscape views of the edit window 504 of the write interface section 501. When the signature is created, the personal communication system 204 allows the personal signature to be reviewed and attached specifically and solely for the adaptation of the personal signature to the personalized communication, for example, a personalized letter, a personalized text, or a personal message. Once the personal signature is composed by the sender and/or the sender has performed one or more actions on the composed personal signature, the personal communication system 204 renders an "authenticate" button or a "verify authenticity" option on the GUI 205h as exemplarily illustrated in FIG. 5I, to provide the option to authenticate the composed personal signature by matching the fingerprints of the sender with the touch identification (ID) access code of the owner of the sender device 201. On receiving an approval for performing the authentication from the sender, that is, when the sender clicks on the "verify authenticity" option on the GUI 205h, the personal communication system 204 renders an authentication window 505 as exemplarily illustrated in FIG. 5I. This authentication window 505 provides an option to the sender to enter a password, for example, biometric input data such as the fingerprints of the sender that are to be matched with the touch ID access code associated with the sender device 201 for authentication of the personal signature. The authentication window 505 also provides an option to the sender to cancel the authentication of the personal signature. The personal communication system 204 initiates the authentication process on receiving the biometric input data from the sender as exemplarily illustrated in FIG. 5J. If the biometric input data of the sender, for example, an owner of the sender device 201 does not match with the touch. ID access code associated with the sender device 201, the personal communication system 204 renders an error message window 506 on the GUI 205h as exemplarily illustrated in FIG. 5K, indicating that the personal signature was not found to be authentic. In an embodiment, when the personal signature is not found to be authentic, the sender either accepts the authentication verification result or provides another personal signature to be authenticated as an autograph. If the biometric input data matches with the touch ID access code associated with the sender device 201, the personal communication system 204 authenticates the personal signature as an autograph and renders a success message window 507 on the GUI 205h as exemplarily illustrated in FIG. 5L, indicating that the personal signature was found to be authentic.

The personal communication system 204 assigns and positions an authentication indicator 508 proximal to the positioned personal signature as exemplarily illustrated in FIG. 5M, to indicate that the personal signature is an authentic autograph of the sender of the personalized communication. In an embodiment, the authentication indicator 508 also indicates that the sender who provided the personal signature is also the owner of the sender device 201. The personal communication system 204 renders the authentication indicator 508 to the recipients on delivery of the personalized communication or to the sender on display of the personalized communication on the GUI 205h before delivery. FIG. 5M thus, exemplarily illustrates a generated personalized communication with the authenticated personal signature and the authentication indicator 508, for example, a star shaped mark, positioned proximal to the authenticated personal signature. In an embodiment, the authentication indicator 508 is a check mark. The personal communication system 204 provides options to the sender to deliver the personalized communication via. One of the delivery modes, save the personalized communication as a draft, discard changes, etc. For example, the personal communication system 204 displays options, for, example, "Deliver Privately, Digital". "Deliver via Postal Service", "Deliver via Short Message Service", "Post as Open Letter", "Save as Draft", "Discard Changes", etc., on the GUI 205h as exemplarily illustrated in FIG. 5N.

FIGS. 6A-6G exemplarily illustrate screenshots of a graphical user interface (GUI) 205h provided by the personal communication system 204 exemplarily illustrated in FIG. 2, on a sender device 201 for generating an electronically signed and authenticated personalized communication. Consider an example where the personal communication application 205 of the personal communication system 204 exemplarily illustrated in FIG. 2, is configured and coded as a mobile application. A sender named "Paul" who is registered with the personal communication system 204 invokes the personal communication application 205 on his sender device 201. On logging into the personal communication system 204, the personal communication application 205 renders a home screen on the GUI 205h as exemplarily illustrated in FIG. 6A. The home screen displays options to read messages, write a letter, explore previously written letters, etc. When Paul clicks on a "fridge" icon that indicates that Paul has 24 unread messages on the GUI 205h, the personal communication application 205 renders a profile view on the GUI 205h as exemplarily illustrated in FIG. 6B. The profile view comprises, for example, identification information of Paul such as a name, an address, a post office number, a country of residence, a flag of the country of residence, etc., a brief description about Paul, a number of unread messages, a pen-pals icon that opens a contact list comprising contacts added by Paul or contacts with whom Paul has communicated, etc.

Figure 6A:
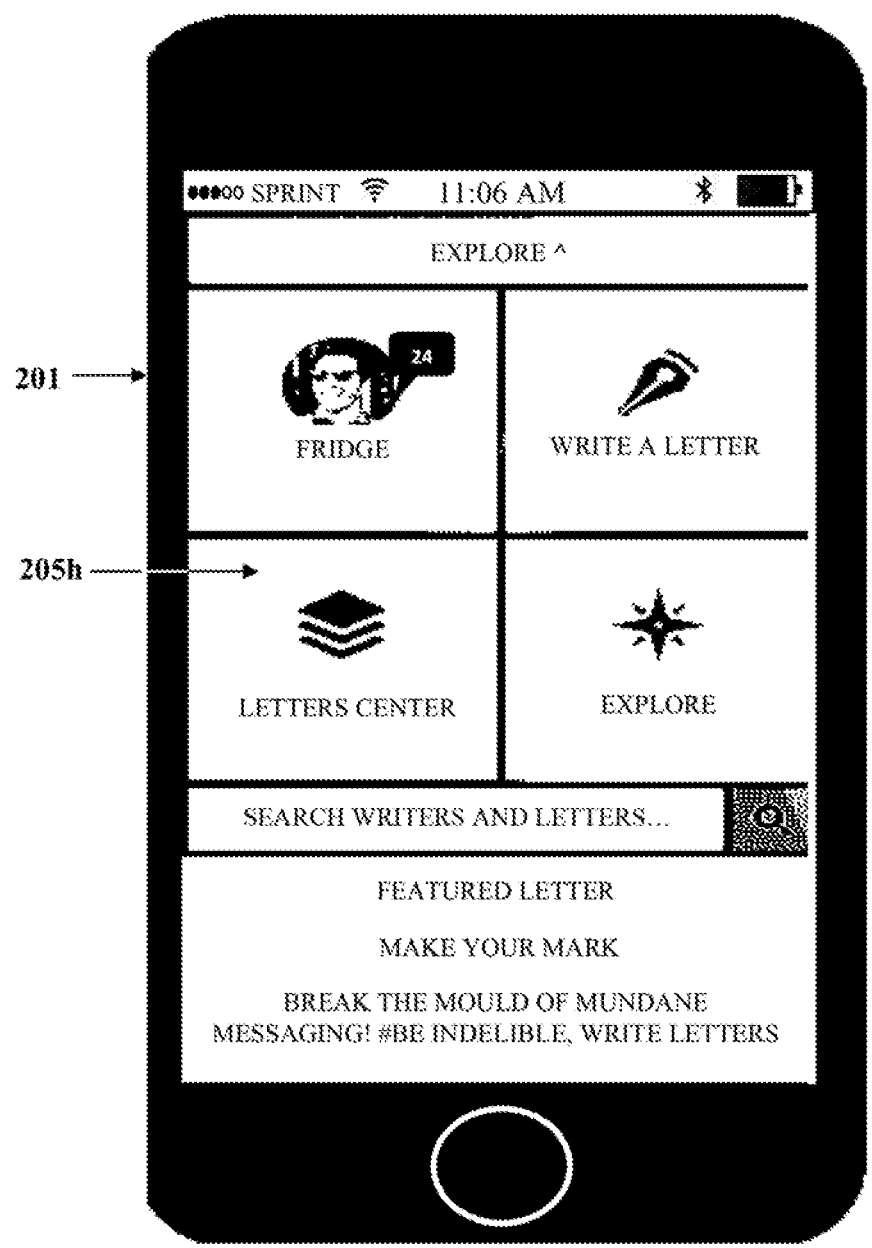
FIGS. 6A-6G exemplarily illustrate screenshots of a graphical user interface provided by the personal communication system on a sender device for generating an electronically signed and authenticated personalized communication.
Figure 6B:
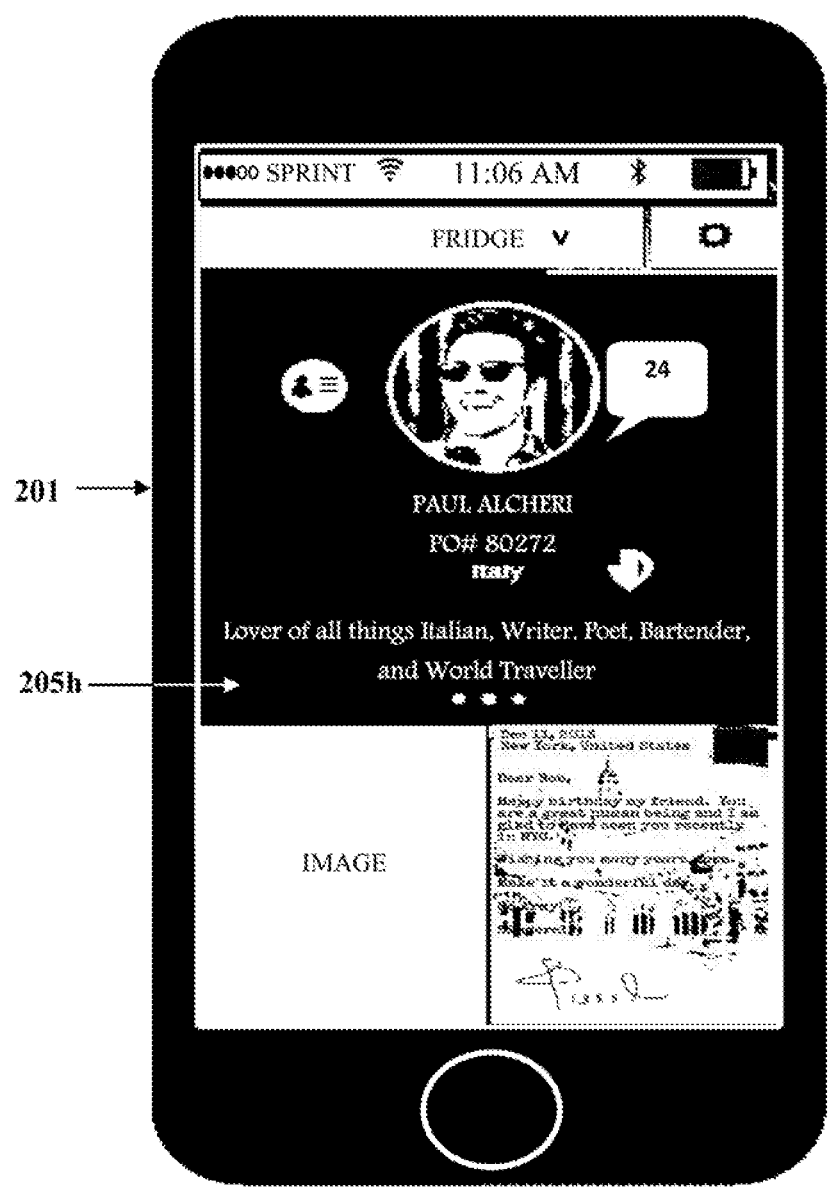
Figure 6C:
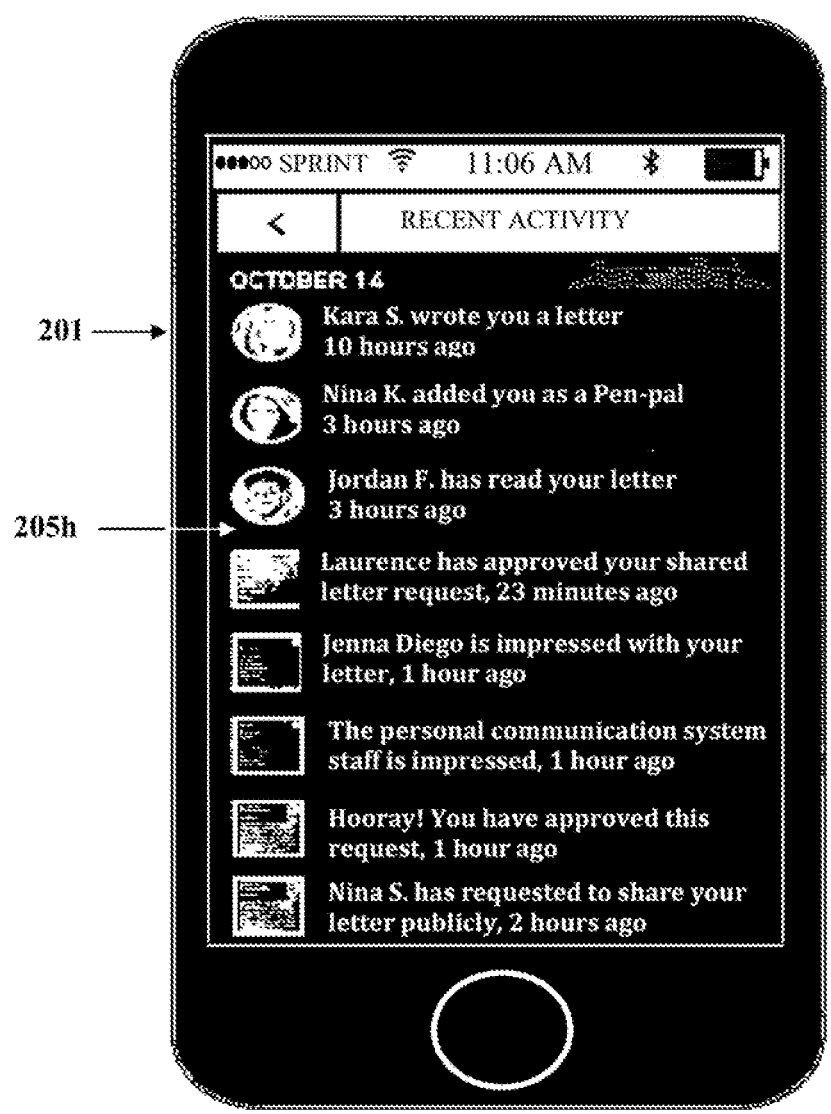
Figure 6D:
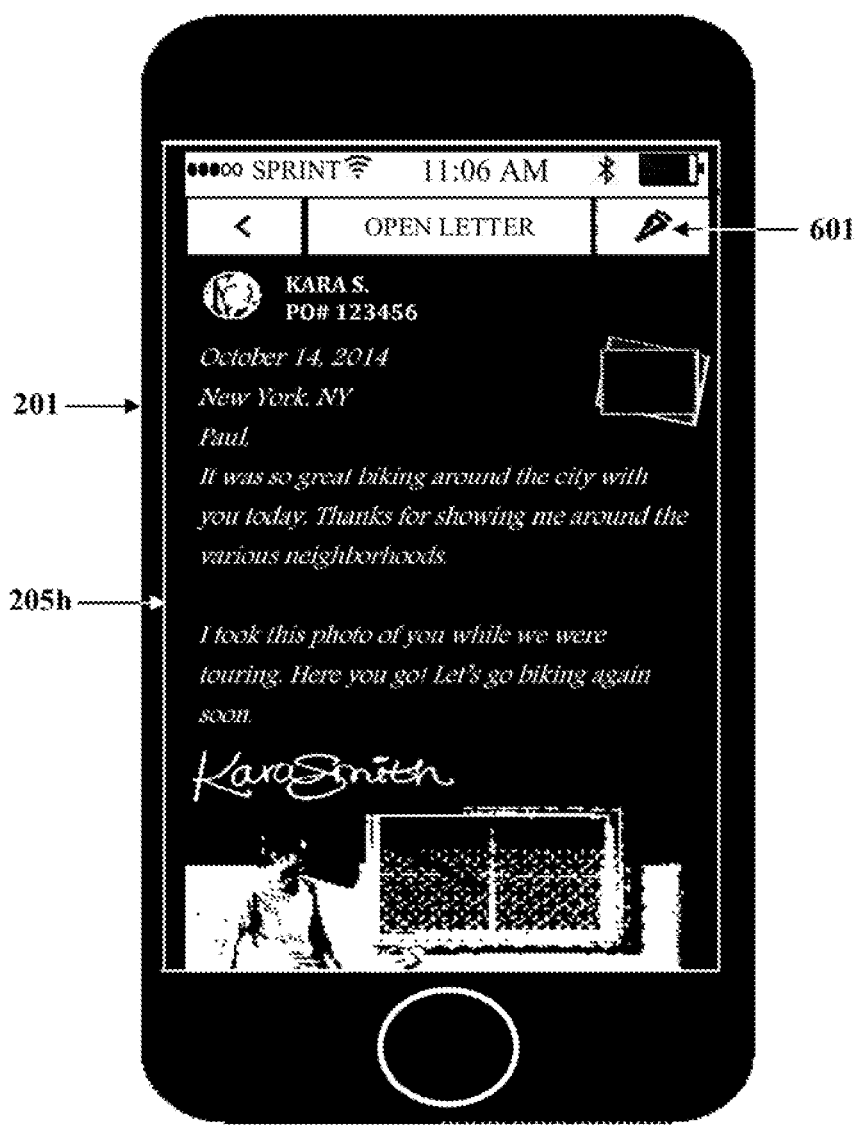
Figure 6E:
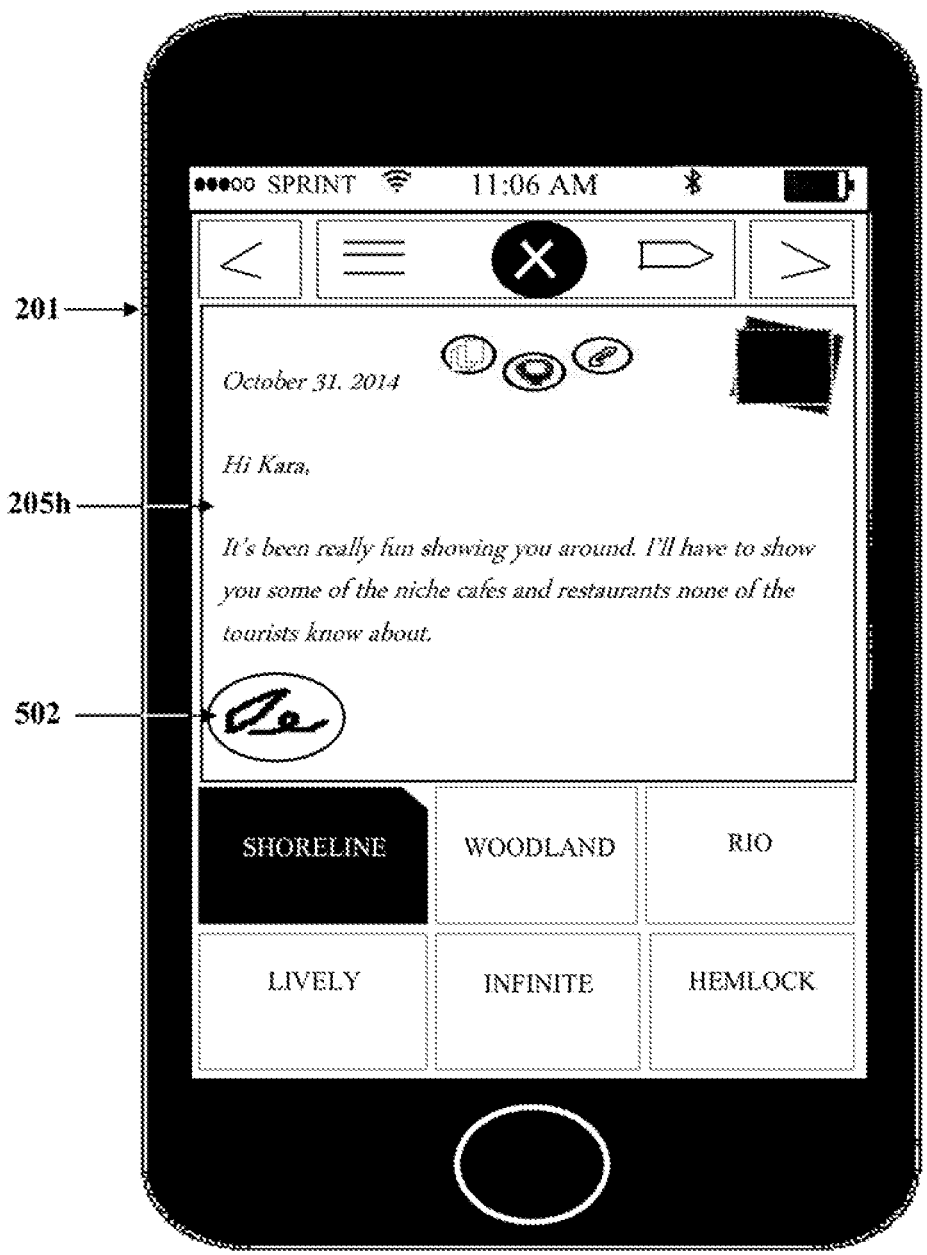
Figure 6F:
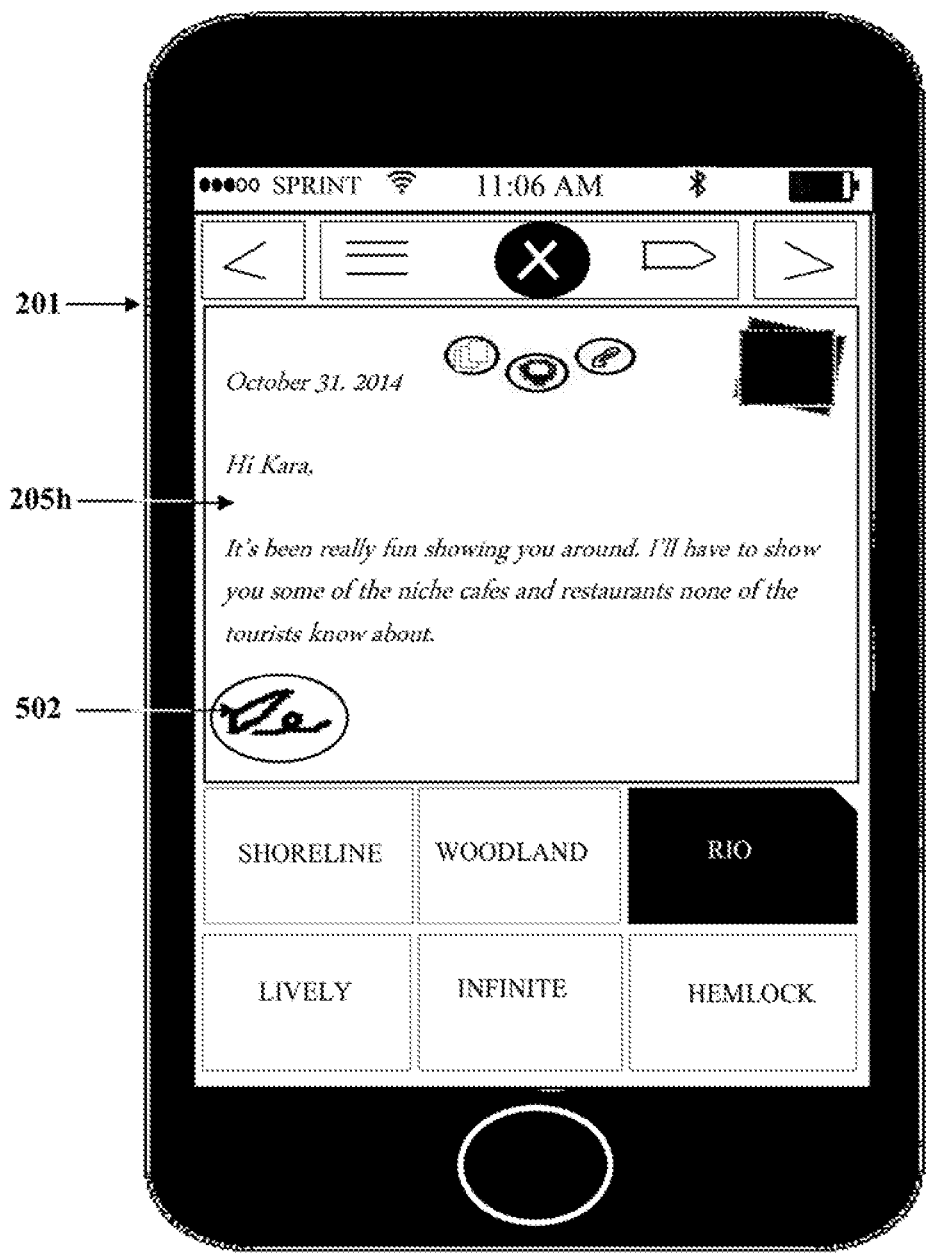
Figure 6G:

When Paul clicks on an icon that displays 24 unread messages, the personal communication application 205 renders a list of unread messages received by Paul as exemplarily illustrated in FIG. 6C. When Paul clicks on an unread message received from "Kara S." who is another user registered with the personal communication system 204, the personal communication application 205 opens and renders the unread message on the GUI 205h as exemplarily illustrated in FIG. 6D. After reading Kara's message, Paul may reply to Kara by clicking on a "write a letter" icon 601 displayed on the GUI 205h as exemplarily illustrated in FIG. 6D. Paul clicks on the "write a letter" icon 601 in order to respond to Kara'S message and chooses to deliver the reply message privately. Paul types the content of the reply message using the on-screen keyboard 503 exemplarily illustrated in FIG. 5B. Paul selects a "Shoreline" theme from the themes displayed on the GUI 205h as exemplarily illustrated in FIG. 6E, for the typed reply message. Paul then decides to apply another theme to the typed reply message and therefore selects a "Rio" theme from the themes displayed on the GUI 205h as exemplarily illustrated in FIG. 6F. Paul may then click on the personal signature icon 502 displayed on the GUI 205h and enter his personal signature as a mobile signature or a social signature via the edit window 504 exemplarily illustrated in FIGS. 5C-5H. The personal communication application 205 authenticates Paul's personal signature as disclosed in the detailed description of FIG. 1 and as exemplarily illustrated in FIGS. 5H-5M. The personal communication application 205 configures parameters of Paul's personal signature based on the "Rio" theme selected and positions the authenticated personal signature with the configured parameters in a predefined section, for example, bottom left, of the reply message as exemplarily illustrated in FIG. 6G. The personal communication application 205 assigns an authentication indicator 508 proximal to the positioned personal signature to indicate the authenticated status of Paul's personal signature. The personal communication application 205 generates the personalized communication comprising the reply message with Paul's positioned personal signature and delivers the generated personalized communication with the positioned personal signature to Kara via a delivery mode of Paul's choice.

Figure 7A:
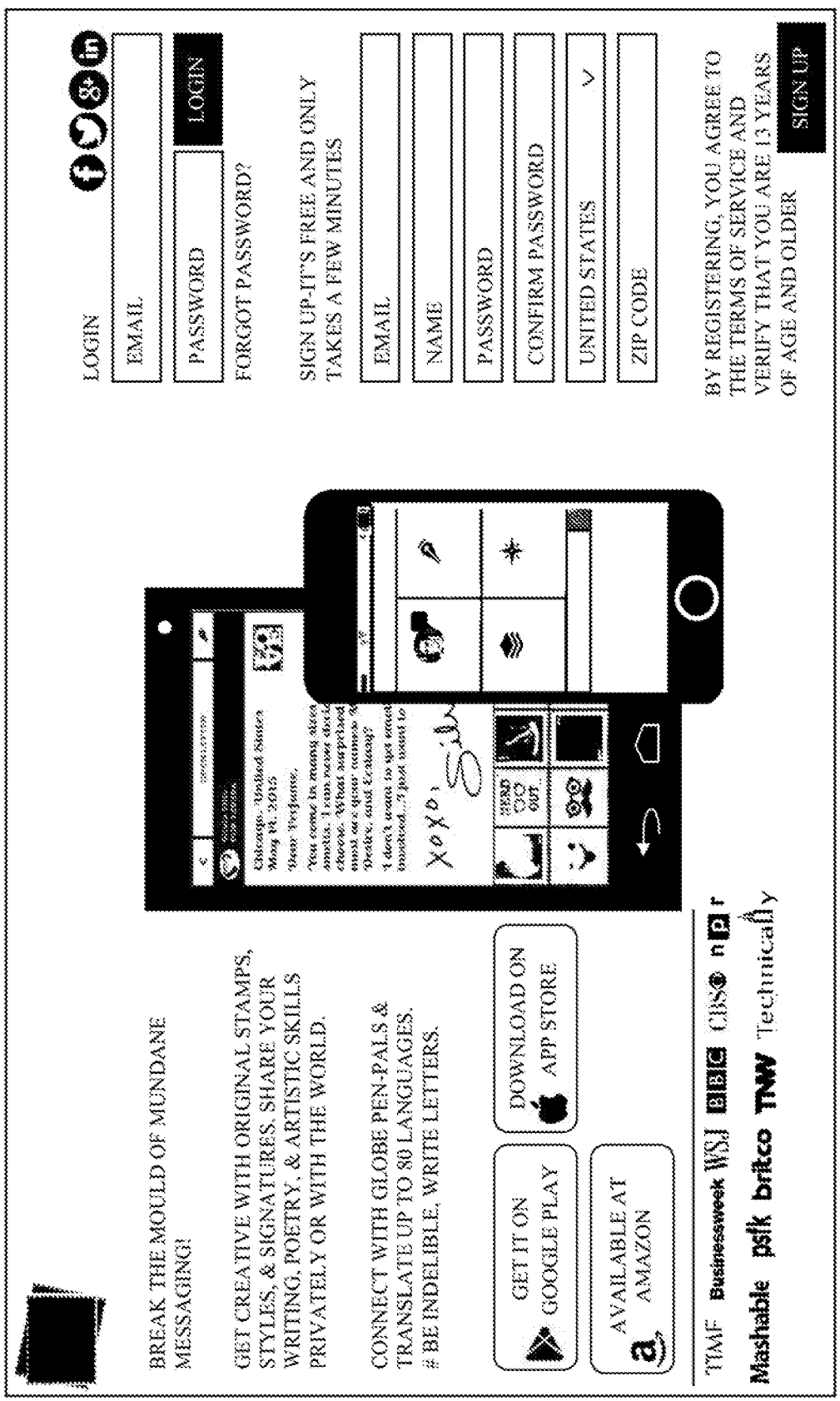
FIGS. 7A-7B exemplarily illustrate screenshots of a graphical user interface provided by the personal communication system configured as a web based platform.
Figure 7B:
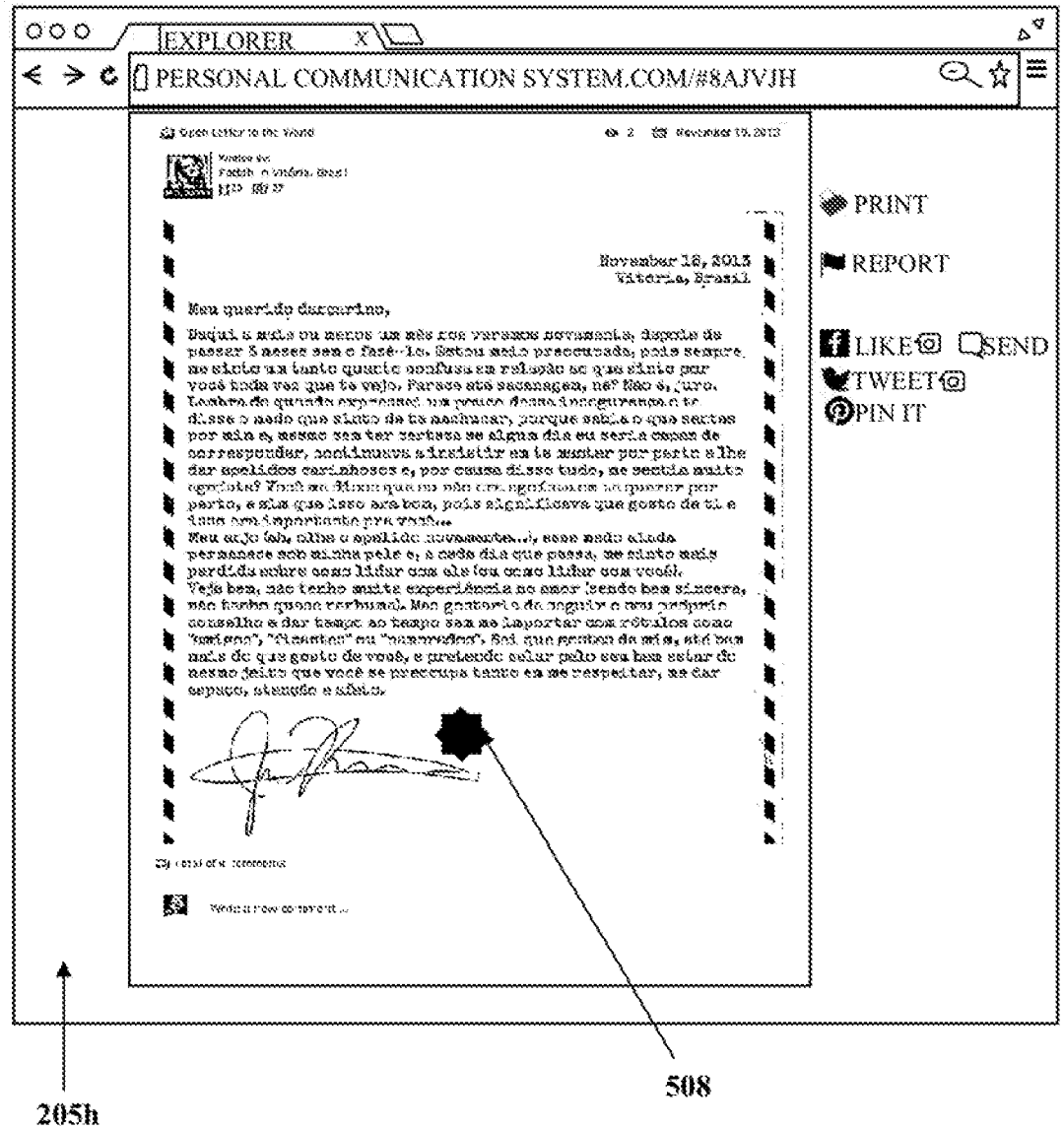

FIGS. 7A-7B exemplarily illustrate screenshots of a graphical user interface (GUI) 205h provided by the personal communication system 204 exemplarily illustrated in FIG. 2, configured as a web based platform. In an embodiment, the personal communication system 204 is configured as a web based platform accessible via a browser of the sender device 201 exemplarily illustrated in FIG. 2, for example, a personal computer. FIG. 7A exemplarily illustrates a homepage of the personal communication system 204 configured as a web based platform. The homepage facilitates downloading of the personal communication application 205 exemplarily illustrated in FIG. 2, on the sender device 201, registration and/or logging into the personal communication system 204. The personal communication system 204 implements personal signature creation, delivery, and display of the personalized communication bundled with the authenticated personal signature through web browsers and web interfaces. FIG. 7B exemplarily illustrates a personalized communication with the positioned personal signature and the authentication indicator 508 as seen by a recipient on his/her recipient device 202a or 202b exemplarily illustrated in FIG. 2, when the personal communication system 204 is configured as a web based platform.

FIG. 8 exemplarily illustrates multiple delivery modes employed by the personal communication system 204 exemplarily illustrated in FIG. 2, for delivering the electronically signed and authenticated personalized communication to one or more recipients and/or recipient devices 202a and 202b of the recipients exemplarily illustrated in FIG. 2. The personal communication system 204 is an enhanced messaging and communication system and implements enhanced rules. For example, the personal communication system 204 routes delivery of the personalized communication, for example, private messages, etc., within the personal communication system 204, and displays the personalized communication bundled with the authenticated personal signature to an authenticated recipient, that is, a recipient who is registered with the personal communication system 204. The personal communication system 204 allows the sender to choose the delivery mode of the electronically signed and authenticated personalized communication. The electronically signed and authenticated personalized communication can be delivered across multiple communication channels, for example, social networks such as Tumblr® of Tumblr, Linkedin® of LinkedIn Corporation, Instagram® of histagram, LLC, Twitter® of Twitter, Inc., Google+ of Google Inc., Pinterest® of Pinterest, Inc., Facebook® of Facebook, Inc., etc., email systems, short message service systems, multimedia messaging service systems, postal delivery systems such as USPS® of United States Postal Service, blogs, etc. An authenticated personal signature once created, distributed, and published, for example, on a social network by the personal communication system 204 becomes a social media object shareable across other social networks.

It will be readily apparent that the various methods, algorithms, and computer programs disclosed herein may be implemented on computer readable media appropriately programmed for computing devices. As used herein, "computer readable media" refers to non-transitory computer readable media that participate in providing data, for example, instructions that may be read by a computer, a processor or a similar device. Non-transitory computer readable media comprise all computer readable media, for example, non-volatile media, volatile media, and transmission media, except for a transitory, propagating signal. Non-volatile media comprise, for example, optical discs or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor, etc. Common forms of computer readable media comprise, for example, a floppy disk a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a hash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

The computer programs that implement the methods and algorithms disclosed herein may be stored and transmitted using a variety of media, for example, the computer readable media in a number of manners. In an embodiment, hard-wired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Some examples of programming languages that can be used comprise C. C++, C#, Java®, JavaScript®, Fortran, a stack oriented programming language, Ruby, Perl®, Python®, Visual Basic®, hypertext preprocessor (PHP), Microsoft®.NET etc. Other object-oriented, functional, scripting, and/or logical programming languages may also be used. The computer program codes or software programs may be stored on or in one or more mediums as object code. Various aspects, of the method and system disclosed herein may be implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. Various aspects of the method and system disclosed herein may be implemented as programmed elements, or non-programmed elements, or any suitable combination thereof. The computer program product disclosed herein comprises one or more computer program codes for implementing the processes of various embodiments.

Where databases are described such as the content database 206, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries can be different from those disclosed herein. Further, despite any depiction of the databases as tables, other formats including relational databases, object-based models, and/or distributed databases may be used to store and manipulate the data types disclosed herein. Likewise, object methods or behaviors of a database can be used to implement various processes such as those disclosed herein. In addition, the databases may, in a known manner, be stored locally or remotely from a device that accesses data in such a database. In embodiments where there are multiple databases in the system, the databases may be integrated to communicate with each other for enabling simultaneous updates of data linked across the databases, when there are any updates to the data in one of the databases.

The present invention can be configured to work in a network environment comprising one or more computers that are in communication with one or more devices via a network. The computers may communicate with the devices directly or indirectly, via a wired medium or a wireless medium such as the Internet, a local area network (LAN), a wide area network (\VAN) or the Ethernet, a token ring, or via any appropriate communications mediums or combination of communications mediums. Each of the devices comprises processors, some examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, some examples of which are disclosed above. While the operating system may differ depending on the type of computer, the operating system will continue to provide the appropriate communications protocols to establish communication links with the network. Any number and type of machines may be in communication with the computers.

The present invention is not limited to a particular computer system platform, processor, operating system, or network. One or more aspects of the present invention may be distributed among one or more computer systems, for example, servers configured to provide one or more services to one or more client computers, or to perform a complete task in a distributed system. For example, one or more aspects of the present invention may be performed on a client-server system that comprises components distributed among one or more server systems that perform multiple functions according to various embodiments. These components comprise, for example, executable, intermediate, or interpreted code, which communicate over a network using a communication protocol. The present invention is not limited to be executable on any particular system or group of systems, and is not limited to particular distributed architecture, network, or communication protocol.

The foregoing examples have been provided merely for the purpose of explanation and are to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A computer implemented method for generating and delivering a uniquely signed personalized communication, said method employing a personal communication system configured to execute computer program instructions for performing said method, said method comprising:

receiving media content and an electronically composed personal signature from a sender device, via a graphical user interface provided by said personal communication system, wherein said personal communication system uses biometrics to convert said received personal signature into a digital autograph;

configuring one or more of a plurality of parameters of said received personal signature based on one or more sender preferences, while maintaining integrity and originality of said received personal signature;

positioning said personal signature with said configured one or more of said parameters in a predefined section of said received media content;

dynamically generating and positioning an authentication indicator proximal to said positioned personal signature, based on said one or more sender preferences, wherein said authentication indicator comprises one of an icon, a symbol, a stamp, a logo, an emblem, a code, an image, a digital watermark, and a multimedia object, and wherein said authentication indicator provides a digital seal of authenticity to said personalized communication;

generating said uniquely signed personalized communication comprising said received media content with said positioned personal signature and said authentication indicator; and delivering said uniquely signed personalized communication with said positioned personal signature and said authentication indicator to said one or more recipients via one or more of a plurality of delivery modes.

2. The computer implemented method of claim 1, wherein said media content comprises one or more of textual content, image content, audio content, video content, audiovisual content, multimedia content, animations, digital content, electronic mail content, messaging content, voicemail content, document content, social media content, and any combination thereof.

3. The computer implemented method of claim 1, wherein said converting the received personal signature into said digital autograph comprises:

authenticating said received personal signature, wherein said authentication of said received personal signature comprises:
  receiving biometric input data from said sender device while receiving said personal signature via said graphical user interface; and
  comparing said received biometric input data with biometric identification data associated with said sender device.

4. The computer implemented method of claim 1, wherein said parameters comprise ink color, font size, font background color, display style, line thickness, and curve smoothness.

5. The computer implemented method of claim 1, wherein said one or more sender preferences comprise a selected theme and one or more configuration inputs for said parameters, and wherein said maintaining said integrity and said originality of said received personal signature comprises maintaining a font style of said received personal signature irrespective of a change in said one or more sender preferences.

6. The computer implemented method of claim 1, wherein said personal signature is composed by said sender in one of a manual input mode and a device input mode using said graphical user interface, and wherein said received media content and said personal signature composed by a sender are stored in a content database of said personal communication system.

7. The computer implemented method of claim 1, further comprising:
  facilitating performance of one or more actions on said received personal signature based on one or more action inputs received from said sender device, wherein said actions comprise reviewing said personal signature, modifying said personal signature, approving said personal signature, deleting said personal signature, and initiating said authentication of said personal signature.

8. The computer implemented method of claim 1, wherein said delivery of said uniquely signed personalized communication with said positioned personal signature and said authentication indicator to said one or more recipients is performed when an optimal time condition defining a minimum time required for composing said personalized communication is met.

9. The computer implemented method of claim 1, wherein said electronically composed personal signature is a handwritten signature.

10. The computer implemented method of claim 1, wherein said delivery modes comprise communication channels in social networks, electronic mail systems, short message service systems, multimedia messaging service systems, online blogs, and postal delivery systems.

11. A personal communication system for generating and delivering a uniquely signed personalized communication, said personal communication system comprising:
  one or more processors, a non-transitory computer readable storage medium, an input/output (I/O) controller, a network interface, a data bus, a display unit, input devices, a fixed media drive, a removable media drive, output devices, a graphical user interface, a content database, a sender device and one or more recipient devices communicating with said personal communication system via a network;
  said non-transitory computer readable storage medium configured to store computer program instructions defined by modules of said personal communication system;
  said one or more processors communicatively coupled to said non-transitory computer readable storage medium, said one or more processors configured to execute said defined computer program instructions;
  said modules of said personal communication system comprising:
    a data reception module configured to receive media content and an electronically composed personal signature from said sender device via a graphical user interface provided by said personal communication system, wherein a signature authentication module uses biometrics to convert said received personal signature into a digital autograph;
    a signature configuration module configured to configure one or more of a plurality of parameters of said received personal signature based on one or more sender preferences, while maintaining integrity and originality of said received personal signature;
    a signature positioning module configured to position said personal signature with said configured one or more of said parameters in a predefined section of said received media content;
    said signature authentication module further configured to dynamically generate and position an authentication indicator proximal to said positioned personal signature, based on said one or more sender preferences, wherein said authentication indicator comprises one of an icon, a symbol, a stamp, a logo, an emblem, a code, an image, a digital watermark, and a multimedia object, and wherein said authentication indicator provides a digital seal of authenticity to said personalized communication;
    a personalized communication generation module configured to generate said uniquely signed personalized communication comprising said received media content with said positioned personal signature; and
    a delivery module configured to deliver said uniquely signed personalized communication with said positioned personal signature to said one or more recipients via one or more of a plurality of delivery modes.

12. The personal communication system of claim 11, wherein said media content received by said data reception module comprises one or more of textual content, image content, audio content, video content, audiovisual content, multimedia content, animations, digital content, electronic mail content, messaging content, voicemail content, document content, social media content, and any combination thereof.

13. The personal communication system of claim 11, wherein said converting said received personal signature into said digital autograph comprises said signature authentication module authenticating said received personal signature, and wherein said authentication of said received personal signature comprises:
  receiving biometric input data from said sender device while receiving said personal signature via said graphical user interface provided; and
  comparing said received biometric input data with biometric identification data associated with said sender device.

14. The personal communication system of claim 11, wherein said parameters configured by said signature configuration module comprise ink color, font size, font background color, display style, line thickness, and curve smoothness.

15. The personal communication system of claim 11, wherein said one or more sender preferences comprise a selected theme and one or more configuration inputs for said parameters, and wherein said signature configuration module maintains said integrity and said originality of said received personal signature by maintaining a font style of said received personal signature irrespective of a change in said one or more sender preferences.

16. The personal communication system of claim 11, wherein said personal signature is composed by said sender in one of a manual input mode and a device input mode using said graphical user interface, and wherein said received media content and said personal signature composed by a sender are stored in said content database.

17. The personal communication system of claim 11, further comprising an action management module configured to facilitate performance of one or more actions on said received personal signature by said action management module based on one or more action inputs received from said sender device, wherein said actions comprise reviewing said personal signature, modifying said personal signature, approving said personal signature, deleting said personal signature, and initiating said authentication of said personal signature.

18. The personal communication system of claim 11, wherein said delivery module is further configured to deliver said uniquely signed personalized communication with said positioned personal signature and said authentication indicator to said one or more recipients when an optimal time condition defining a minimum time required for composing said personalized communication is met.

19. The personal communication system of claim 11, wherein said graphical user interface is a touch enabled interface configured to receive said electronically composed personal signature, and wherein said electronically composed personal signature is a handwritten signature.

20. The personal communication system of claim 11, wherein said delivery modes comprise communication channels in social networks, electronic mail systems, short message service systems, multimedia messaging service systems, online blogs, and postal delivery systems.

21. A computer program product comprising a non-transitory computer readable storage medium, said non-transitory computer readable storage medium storing computer program codes that comprise instructions executable by at least one processor, said computer program codes comprising:

a first computer program code for receiving media content and an electronically composed personal signature from a sender device via a graphical user interface system, wherein a personal communication system uses biometrics to convert said received personal signature into a digital autograph;

a second computer program code for configuring one or more of a plurality of parameters of said received personal signature based on one or more sender preferences, while maintaining integrity and originality of said received personal signature;

a third computer program code for positioning said authenticated personal signature with said configured one or more of said parameters in a predefined section of said received media content;

a fourth computer program code for dynamically generating and positioning an authentication indicator proximal to said positioned personal signature, based on said one or more sender preferences, wherein said authentication indicator comprises one of an icon, a symbol, a stamp, a logo, an emblem, a code, an image, a digital watermark, and a multimedia object, and wherein said authentication indicator provides a digital seal of authenticity to said personalized communication a fifth computer program code for generating said uniquely signed personalized communication comprising said received media content with said positioned personal signature; and a sixth computer program code for delivering said uniquely signed personalized communication with said positioned personal signature to one or more recipients via one or more of a plurality of delivery modes.

22. The computer program product of claim 21, further comprising:

a seventh computer program code for said conversion of said received personal signature into said digital autograph, wherein said conversion of said received personal signature into said digital autograph comprises authenticating said received personal signature, wherein said authentication of said received personal signature by said personal communication system comprises:

receiving biometric input data from said sender device while receiving said personal signature via said graphical user interface provided by said personal communication system; and comparing said received biometric input data with biometric identification data associated with said sender device.

* * * * *